United States Patent
Govender et al.

(10) Patent No.: US 7,867,079 B2
(45) Date of Patent: Jan. 11, 2011

(54) PROMOTION ADMINISTRATION SYSTEM AND METHOD

(75) Inventors: Devan Govender, Durban (ZA); Francesco Verardi, Douglas (GB)

(73) Assignee: Waterleaf Limited (IM)

( * ) Notice: Subject to any disclaimer, the term of this patent is extended or adjusted under 35 U.S.C. 154(b) by 380 days.

(21) Appl. No.: 10/550,744

(22) PCT Filed: Sep. 9, 2005

(86) PCT No.: PCT/IB2005/002678

§ 371 (c)(1), (2), (4) Date: Aug. 24, 2006

(87) PCT Pub. No.: WO2006/027677

PCT Pub. Date: Mar. 16, 2006

(65) Prior Publication Data

US 2007/0060303 A1   Mar. 15, 2007

(30) Foreign Application Priority Data

Sep. 10, 2004   (GB) ................................ 0420079.6
Oct. 20, 2004   (GB) ................................ 0423259.1

(51) Int. Cl.
    A63F 9/24   (2006.01)
(52) U.S. Cl. ...................................................... 463/25
(58) Field of Classification Search ................... 463/25, 463/29, 40–43; 273/292, 293; 705/14.23, 705/17
    See application file for complete search history.

(56) References Cited

U.S. PATENT DOCUMENTS 6,379,248 B1 * 4/2002 Jorasch et al. ................. 463/25
6,712,697 B2 * 3/2004 Acres ............................ 463/25
7,063,617 B2 * 6/2006 Brosnan et al. ............... 463/25
7,341,518 B2 * 3/2008 Muskin ......................... 463/25
2002/0151359 A1 10/2002 Rowe
2004/0032086 A1 2/2004 Barragan (Continued)

FOREIGN PATENT DOCUMENTS

AU   2003246319 A1   10/2003

(Continued)

OTHER PUBLICATIONS

International Search Report and Written Opinion for International Application No. PCT/IB05/02678, dated Jan. 16, 2007.

(Continued)

*Primary Examiner*—David L Lewis
*Assistant Examiner*—Masud Ahmed
(74) *Attorney, Agent, or Firm*—McDonnell Boehnen Hulbert & Berghoff LLP

(57) ABSTRACT

A system for administering promotions in which a player is awarded promotion credit to be consumed in wagering activities includes a credit administration facility that maintains a player credit account, and a display means capable of displaying a composition of the player credit account on a display means. The promotion credit is either one or both of a priori and a posteriori promotion credit. The credit administration facility automatically determines the composition of the player credit account as a function of any credit purchases made by the player, wagers made by the player and their corresponding payouts, and any promotion credit awarded to the player.

10 Claims, 11 Drawing Sheets

U.S. PATENT DOCUMENTS

2004/0254011 A1* 12/2004 Muskin ................. 463/25
2005/0170883 A1* 8/2005 Muskin ................. 463/25

FOREIGN PATENT DOCUMENTS

| EP | 1351180 | A2 | 10/2003 |
|----|---------|----|----|
| EP | 1351180 | A3 | 2/2004 |

OTHER PUBLICATIONS

International Preliminary Report on Patentability for International Application No. PCT/IB05/02678, dated Mar. 13, 2007.

Supplementary European Search Report for European Patent Application No. EP 05 78 9874, dated Oct. 8, 2008, 6 pages.

* cited by examiner

PROMOTION ADMINISTRATION SYSTEM AND METHOD

FIELD

This system relates to administration of promotions and, more particularly, to a system for administering promotions associated with wagering applications. Still more particularly, system relates to administration of promotions associated with wagering applications in which a predetermined quantity of value is provided to a player as a bonus to be consumed in that player's wagering activities. Another aspect of the system relates to a method for administering promotions associated with wagering applications in which a predetermined quantity of value is provided to a player as a bonus to be consumed in that player's wagering activities.

BACKGROUND

The use of a promotional bonus consisting of a predetermined quantity of value as a means of attracting players to participate in games of chance or skill is known and widely practised. In this specification, for convenience, the term "promotion credit" is used to denote a quantity of value provided to a player as an incentive, or bonus, to be used by that player in wagering activities. Such games of chance or skill are generally available at online casinos or online poker rooms and the like. In this specification, an embodiment of the system will be described with particular reference to its application in conjunction with an online casino and an online poker room. It is to be clearly understood, however, that the use of the invention is not limited to this particular application.

Promotion credit may arise in many ways, for example, as a result of a sign-on bonus in which a player is given a predetermined quantity of credit for registering as an authorised player at an online casino, or as a result of a purchase bonus in which the player is given the predetermined quantity of credit as a bonus when purchasing an amount of credit to be consumed during game play at the online casino. It is usual for this promotion credit given to the player to be a percentage of the amount of credit purchased by the player. The promotion credit is intended for use by the player to wager on games of chance or skill offered by the online casino. This type of credit is available to the player for immediate use for wagers and will be termed, for convenience, as a priori promotion credit.

A further way in which promotion credit can arise is as a result of a sign-on bonus in which a player who registers as an authorised player at an online poker room is promised a predetermined quantity of credit at a future time. This type of promotion credit is not made available to the player for immediate use, but only becomes available for use by the player for wagering purposes once certain conditions associated with the promotion credit have been met, as will be described below. This type of promotion credit will be referred to, for convenience, as a posteriori promotion credit.

Promotion credit can be problematic for entities that operate online casinos, sportsbooks and poker rooms.

If a player is able to unconditionally cash out, or redeem for monetary value, a priori promotion credit awarded to that player, then the operating entity will be left in a loss-making situation without deriving adequate economic benefit therefrom. This problem can be addressed by utilising a posteriori promotion credit, but this is unattractive to would-be players at online casinos and sportsbooks as such players have become accustomed to promotion credit that is available for immediate use.

For these reasons, a priori promotion credit is generally accompanied by restrictions. Firstly, a priori promotion credit is usually treated by online casino management as being "non-cashable", meaning that it may not be cashed out, although it can be used to wager on any game of chance offered by the online casino. Further, the a priori promotion credit carries certain play through restrictions that must be met before the a priori promotion credit or any winnings arising from wagers made with the a priori promotion credit may be cashed out. Such play through restrictions are usually expressed as wager requirements for the promotion credit, namely how many times the promotion credit must be wagered in game play, after which any portion of the promotion credit that remains, and any winnings arising therefrom, may be cashed out. For example, a play through requirement of "5×", or "five times", means that the a priori promotion credit must be wagered five times before it can be cashed out, together with any winnings that have been generated therefrom. Thus, if the a priori promotion credit is, say, US$ 50, the player would have to wager US$ 250 in game play before the US$ 50 a priori promotion credit, or any portion of it that remains, can be cashed out, together with any winnings arising therefrom.

It is also known to exclude wagers on certain specific casino games from contributing to the players' play through requirements in respect of a priori promotion credit. These are typically games having a narrow casino profit margin and, particularly, games in which the casino profit margin, and thus the payout percentage of the game, is easily determinable from the game rules. Examples of such games are Blackjack, where the payout percentage of the game can be calculated as a function of the game rules and a number of decks of cards used in the game, and Video Poker using a standard deck of 52 playing cards, where the payout percentage can be derived from the game rules and the pay table. Payout percentages on such narrow profit margin games can be as high as 98%.

In order to allow wagers on narrow profit margin games to contribute to the play through requirements, it is not uncommon for online casino managements to set high play through thresholds, in some instances as high as 35×. Even with such high play through requirements, a player can utilise the a priori promotion credit to satisfy the play through requirements in the above example on a 98% payout game and, statistically, still be able to cash out and walk away with, for example:

$$US\$\ 50*(0.98)**35=US\$\ 24.65,$$

or over 49% of the a priori promotion credit, without having used any of the player's own funds, thus leaving the online casino in a loss-making situation. Such player conduct is referred to in the online casino industry as "bonus abuse". A bonus abuser is a player who seeks to use only the a priori promotion credit to meet the play through requirements, without using the player's own funds, and to minimise attrition of the a priori promotion credit by playing narrow profit margin games, in order to cash out what remains of the a priori promotion credit once the play through requirements have been met.

A further difficulty related to a priori promotion credit arises in relation to management of cash-outs. The finance and accounting systems of online casinos often do not differentiate between promotion credit and credit that has actually been purchased by a player. The player is nominally allowed to cash out the full balance of the player's credit account. A cash-out transaction commences by debiting the player's credit account with an amount of credit that the player wishes to cash out. The cash-out transaction is then left pending for a period of time, typically between 24 and 48 hours, before being processed by the casino management. The cash-out transaction is then reviewed manually and checked against the player's game play records to see whether the player has met the play through requirement. If the play through requirement has been met, the cash-out transaction is completed and the player is paid. The cash-out process is time-consuming, laborious and prone to error.

If the play through requirement has not been met, the cash-out transaction is stopped and, as appropriate, reversed by re-crediting the player's credit account with the amount of credit the player wished to cash out. The casino management is then required to notify the player that the cash-out transaction could not be completed as the play through associated with the particular a priori promotion credit had not been satisfied. This particular aspect of the cash-out process is often vague and lacking in transparency. Overall, the process can result in a frustrating experience for both the player and the casino management.

As with a priori promotion credit, a posteriori promotion credit is often also subject to restrictions. In this case, a play-through restriction must be met by the player, using the player's own purchased credit, before the a posteriori promotion credit is awarded to the player. Once the play through requirement has been met, the a posteriori promotion credit awarded to the player is immediately cashable. A posteriori promotion credit is usually less problematic to administer than the a priori promotion credit described above. All that is required is for the online poker room management to monitor the player's game play and to credit the player's credit account with the predetermined quantity of a posteriori promotion credit once the play through requirement has been met. As the a posteriori promotion credit is immediately cashable once credited to the player's credit account in this manner, the cash out process is generally more transparent and simple.

It is also known for online casinos to offer authorised casino players an opportunity to play poker at an online poker room or, conversely, for casinos to offer authorised online poker players an opportunity to play games at an online casino. In such a case, a player will have a single credit account and will expect to be able to use any credit in the player's credit account at either the online casino or the online poker room, as desired. A priori promotion credit generally is not used in online poker rooms as a player awarded such a priori promotion credit may purposely lose the promotion credit to another player at the poker room with whom the player is in collusion. The colluding player is then able to redeem the a priori promotion credit so won. This type of promotion credit abuse is often referred to as "chip dumping".

From the aforegoing discussion, it will be appreciated that, in general, a priori promotion credit can be used in instances where players wager on games in which a "house" acts as banker. Such games are termed "house edge services" and include, generally, games offered by, for example, online casinos, sportsbooks, bingo rooms and online multiplayer casinos. A posteriori promotion credit, on the other hand, is used in instances where players wager on games in which the house does not act as banker, but merely levies a transaction charge on the game. Such games are termed "peer-to-peer services" and include, for example, those found at online poker rooms and online betting exchanges.

OBJECT

It is an object of this invention to provide a system for administering promotions, and a method for administering promotions that will, at least partially, alleviate the above-mentioned difficulties and disadvantages.

SUMMARY

There is provided a system for administering promotions in which a player is awarded any one or more of a priori promotion credit and a posteriori promotion credit to be consumed in wagering on house edge services and peer-to-peer services characterised in that substantially all of the a priori promotion credit and any substantially any portion of the a posteriori promotion credit that is redeemable for monetary value may be utilised by the player to make wagers on the house edge services; and substantially any portion of the a priori promotion credit that is not redeemable for monetary value is not utilisable by the player to make wagers on peer-to-peer services.

Further features provide for the a priori promotion credit to be entirely unredeemable, either wholly or in part, for monetary value, alternatively, for the a priori promotion credit to become progressively redeemable for monetary value as a function of wagers made by the player on house edge services.

There is also provided a method for administering promotions in which a player is awarded any one or more of a priori and a posteriori promotion credit to be consumed in wagering on house edge services and peer-to-peer services characterised in that the method includes the steps of:

enabling the player to utilise substantially all of the a priori promotion credit and substantially any portion of the a posteriori promotion credit that is redeemable for monetary value to make wagers on the house edge services; and preventing the player from utilising substantially any portion of the a priori promotion credit that is not redeemable for monetary value to make wagers on peer-to-peer services.

There is further provided for preventing any portion of the a priori promotion credit from becoming redeemable for monetary value, alternatively for making the a priori promotion credit progressively redeemable for monetary value as a function of wagers made by the player on house edge services.

In accordance with this approach there is provided a system for administering promotions associated with a wagering application in which a player is awarded a priori promotion credit from time to time to make wagers on a game of chance characterised in that the a priori promotion credit awarded to the player is not redeemable for monetary value, either wholly or in part.

There is also provided a method for administering promotions associated with a wagering application in which a player is awarded a priori promotion credit from time to time to make wagers on a game of chance, characterised in that the method includes the step of preventing redemption of the a priori promotion credit for monetary value, either wholly or in part.

There is provided a system for administering promotions associated with a wagering application in which a player purchases credit to make wagers on a game of chance, the player being awarded a priori promotion credit from time to time, comprising:

a credit administration facility operable to maintain a credit account for the player;

characterised in that the credit administration facility is operable to automatically determine the balance of the credit account of the player as a function of any credit purchases made by the player, wagers made by the player and their corresponding payouts, and any a priori promotion credit awarded to the player, the credit administration facility being instructable to display the balance of the credit account to the player on a display means.

Further features of the system provide for the credit administration facility to be operable to also maintain at least one sub-account pertaining to the player's credit account, the at least one sub-account being a non-cashable sub-account corresponding to a portion of the player's credit account that is not redeemable for monetary value, and for the credit administration facility to be instructable to display a balance of the at least one sub-account to the player on the display means.

Still further features of the system provide for the credit administration facility to detect the award of a priori promotion credit to the player, the promotion credit having a corresponding quantum and a corresponding play-through multiplier, for the credit administration facility to increment a balance of the player's non-cashable sub-account by the quantum of the a priori promotion credit, for the credit administration facility to also maintain at least one play-through sub-account for the player, the at least one play-through sub-account being either one of a play-through required sub-account, and a play-through achieved sub-account, for the credit administration facility to be instructable to display a balance of the at least one play-through sub-account to the player on the display means, and for the credit administration facility to maintain both the play-through required and the play-through achieved sub-accounts.

Yet further features of the system provide for the credit administration facility to increment the balance of the play-through required sub-account by an amount that is a function of the quantum of the a priori promotion credit and the play through multiplier, for the function to be the quantum of the a priori promotion credit multiplied by the play through multiplier, for the credit administration facility to increment the balance of the play through achieved sub-account by an amount equal to a size of the wager made by the player on the game of chance, for the credit administration facility to debit the balance of the player's credit account and the balance of the non-cashable sub-account with the size of the wager and to credit these balances with a payout arising from the wager, if successful, and for the credit account facility to clear the balances of the play through required the play through achieved sub-accounts when the size of the wager exceeds the balance of the non-cashable sub-account.

There is further provided for the credit administration facility to enable the player to request a cash-out at any time, for the credit administration facility to automatically determine, in response to the player's cash-out request, a balance of the player credit account that is redeemable for monetary value and to display the redeemable balance to the player on the display means, for the redeemable balance to be the difference between the balance of the player's credit account and the non-cashable sub-account if the balance of the play-through achieved sub-account is less than the balance of the play through required sub-account, and for the redeemable balance to be the difference between the balance of the player's credit account and the lesser of the balance of the non-cashable sub-account and a cumulative total of a priori promotion credit awarded to the player if the balance of the play through achieved sub-account is not less than the balance of the play through required sub-account.

There is also provided a method for administering promotions associated with a wagering application in which a player purchases credit to make wagers on a game of chance, the player being awarded a priori promotion credit from time to time, including the step of:

maintaining a credit account for the player;

characterised in that the method includes the further steps of:

automatically determining the balance of the credit account of the player as a function of any credit purchases made by the player, wagers made by the player and their corresponding payouts, and any a priori promotion credit awarded to the player; and displaying, upon instruction the balance of the credit account to the player.

There is further provided for maintaining at least one sub-account pertaining to the player's credit account, the at least one sub-account being a non-cashable sub-account corresponding to a portion of the player's credit account that is not redeemable for monetary value, and displaying, upon instruction, a balance of the at least one sub-account to the player.

There is still further provided for detecting the award of a priori promotion credit to the player, the a priori promotion credit having a corresponding quantum and a corresponding play through multiplier, for incrementing a balance of the player's non-cashable sub-account by the quantum of the a priori promotion credit, for also maintaining at least one play through sub-account for the player, the at least one play through sub-account being either one of a play through required sub-account, and a play through achieved sub-account, for displaying, on instruction, a balance of the at least one play-through sub-account to the player, and for maintaining both the play-through required and the play-through achieved sub-accounts.

There is yet further provided for incrementing the balance of the play through required sub-account by an amount that is a function of the quantum of the of the a priori promotion credit and the play through multiplier, for the function to be the quantum of the a priori promotion credit multiplied by the play through multiplier, for incrementing the balance of the play through achieved sub-account by an amount equal to a size of the wager made by the player on the game of chance, for debiting the balance of the player's credit account and he balance of the non-cashable sub-account with the size of the wager and crediting these balances with a payout arising from the wager, if successful, and for clearing the balances of the play through required and the play through achieved sub-accounts when the size of the wager exceeds the balance of the non-cashable sub-account.

There is also provided for enabling the player to request a cash-out at any time, for automatically determining, in response to the player's cash-out request, a balance of the player credit account that is redeemable for monetary value and displaying the redeemable balance to the player, for determining the redeemable balance to be the difference between the balance of the player's credit account and the non-cashable sub-account if the balance of the play-through achieved sub-account is less than the balance of the play through required sub-account, and determining the redeemable balance to be the difference between the balance of the player's credit account and the lesser of the balance of the non-cashable sub-account and a cumulative total of a priori promotion credit awarded to the player if the balance of the play-through achieved sub-account is not less than the balance of the play through required sub-account There is provided a system for administering promotions associated with a wagering application in which a player is awarded a priori promotion credit from time to time to make wagers on a game of chance characterised in that the a priori promotion credit awarded to the player becomes progressively redeemable for monetary value as a function of a cumulative total wagered by the player on the game of chance.

There is also provided a method for administering promotions associated with a wagering application in which a player is awarded a priori promotion credit from time to time to make wagers on a game of chance characterised in that the method includes a step of causing the a priori promotion credit awarded to the player to become redeemable, progressively, for monetary value as a function of a cumulative amount wagered by the player on the game of chance.

BRIEF DESCRIPTION OF THE DRAWINGS

A preferred embodiment of the invention is described below, by way of example only, and with reference to the abovementioned drawings, in which.

DETAILED DESCRIPTION OF THE INVENTION

The following embodiments and aspects thereof are described and illustrated in conjunction with computer systems, user interface features, and methods which are provided by way of illustration and not limitation.

Figure 1:
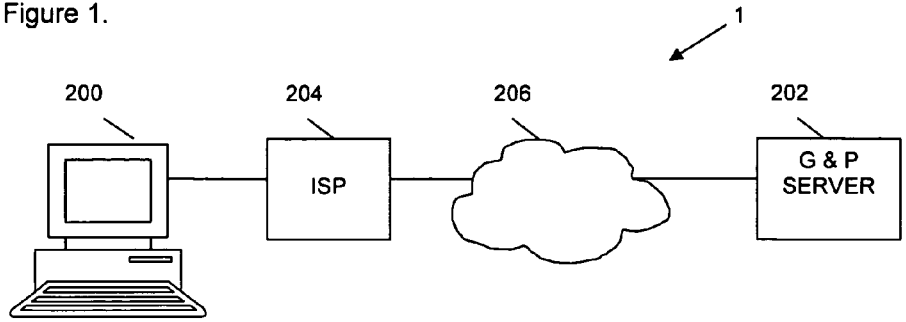
FIG. 1 is a network diagram showing a client computer that connects to a gaming and poker server in order to download gaming and poker software and exchange messages with the gaming and poker server and thereby play casino games and poker using promotion credit for wagering.

Referring to FIG. 1, a system for administering promotions is indicated generally by reference numeral (1). This section of the disclosure will describe the apparatus, processing, and message flow for administering promotions in which a player is awarded promotion credit to be consumed in wagering and game play.

FIG. 1 is a network diagram showing a client computer (200) that connects to a gaming and poker server (202) via an Internet Service Provider (204) and Internet Protocol network (206) such as the Internet. The client computer (200) downloads gaming software from the gaming and poker server (202) and exchanges messages with the gaming server (202) to play casino games and multiplayer poker.

At the hardware level, the client computer (200) may take the form of any general-purpose computing device such as, for example, a personal computer running a Windows 2000, Windows XP, Windows ME and the like operating system. Only one such computer (200) is shown, but in practice any number of client computers may be connected simultaneously with the gaming and poker server (202) and play the casino games and multiplayer poker. The gaming and poker server (202) takes the form of a general-purpose computing platform and may operate, for example, under a Windows Server 2003 operating system or other state of the art system. The gaming and poker server (202) may include other functions, such as an HTML web page server. In a representative embodiment, the gaming and poker server (202) is managed by an entity offering Internet casino gaming and Internet multiplayer poker services via a presence on the World Wide Web.

It is feasible for the functions of the gaming and poker server (202) to be provided by separate units in which the client computer (200) may connect to a gaming server and a distinct poker server via the same Internet Service Provider (204) and Internet Protocol Network (206). The client computer (200) downloads gaming software from the gaming server and exchanges messages with the gaming server to play casino games. The client computer (200) also downloads poker software from the distinct poker server and exchanges messages with the poker server to play multiplayer poker. The principles of this invention apply equally where separate units of hardware provide the functions of the gaming server and the poker server, respectively. For purposes of convenience, however, this discussion will be limited to an embodiment where a single unit of hardware provides the functions of gaming server and poker server.

Figure 2:
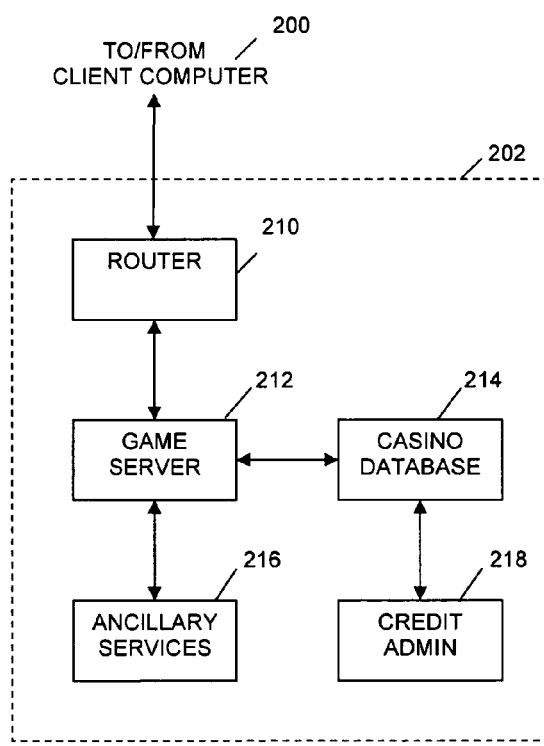
FIG. 2 is a more detailed diagram of the gaming and poker server showing the software modules included in the gaming and poker server in a preferred embodiment.

FIG. 2 is a more detailed diagram of the gaming and poker server (202) showing the software modules included in the gaming and poker server (202) in a preferred embodiment. The modules include a router module (210), a game service module (212), a casino database module (214), and an ancillary services module (216).

The router (210) provides one point of contact for all download clients (200) communicating with the gaming and poker server (202). A download client (200) establishes a connection to the router (210) when a player using the download client (200) wishes to play a casino game or a game of multiplayer poker. The router (210) receives a message from the download client and passes the message to the game service (212) for processing.

In the illustrated embodiment, the game service module (212) is written as one or more Windows Server 2003 services. The game service (212) generates an outcome for the game that the player wishes to play, determines the results of any wagers and transmits the outcome and the result of the wager back to the download client.

The casino database (214) is used to log the state of a player's session with the gaming and poker server (202). The game service (212) on the gaming and poker server (202) writes the outcome of the game and the result of the wager to the casino database (214), before the outcome and the result of the wager are transmitted to the download client (200). The casino database (214) uses a state engine such that if the download client (200) disconnects from the gaming and poker server (202) for whatever reason (say, communication failure or session termination by the player) while playing a casino game, the player will, upon subsequent reconnection with the gaming and poker server (202), be presented with an identical screen display and game state as when disconnection occurred. If the download client (200) disconnects from the gaming and poker server (202) while playing a game of multiplayer poker, the player will be given a limited period, say 30 seconds, to reconnect to the poker and gaming server (202), failing which the player's participation in the poker game is terminated.

The gaming and poker server (202) also includes an ancillary services module (216) that performs ancillary functions related to operation of the gaming site, such as player login, player registration, and the like.

The client computer (200) executes casino client software and poker client software that is either downloaded from the gaming and poker server (202) and subsequently installed on the client computer, or is installed directly from a storage medium such as a compact disc. In the illustrated embodiment, the software is downloaded directly from the gaming and poker server (202).

Figure 3:
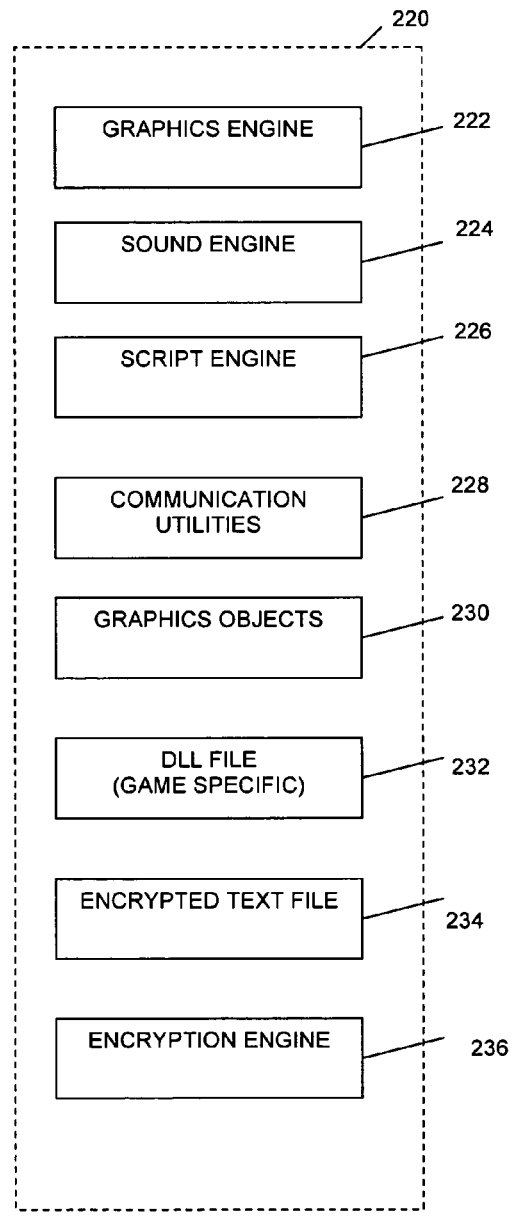
FIG. 3 is a more detailed diagram of a set of software modules that are downloaded onto the client computer in order to communicate with the gaming and poker server and play casino games and multiplayer poker.

FIG. 3 is a more detailed diagram of a set of software modules (220) which are downloaded onto the client computer (200) and stored locally in memory in the computer (200) in order to communicate with the gaming and poker server (202) and play the casino and multiplayer poker games multi-play poker games referred to above. These modules include a graphics engine (222) which renders graphics on the screen of the client computer (200), a sound engine (224) which plays sound effects occurring during play, a script engine (226) which renders text on the screen, communications utilities (228) which enable the client computer (200) to communicate with the gaming and poker server (202), a set of graphics objects (230) such as, for example the cards of a deck of cards, buttons and text objects, a game-specific Dynamic Link Library (DLL) file (232) that contains all the logic required for the game, and which controls the presentation of the game to the player, an encrypted text file (234) that tells the game where to position the graphics, the buttons, what graphics to load, etc., and an encryption engine (236) that provides 128-bit encryption of data communication between the download client (200) and the gaming and poker server (202).

A player wishing to play a casino game or multiplayer poker is first required to register and to create a player credit account. The player's credit account is maintained in the casino database (214), which stores a corresponding balance of the player's credit account. The player is required to pre-fund the credit account by purchasing credit that will, for convenience, be denominated in this description in "units". In the description that follows, it is assumed that the player has initially registered, created the credit account and pre-funded the credit account.

In order to play a casino game or multiplayer poker, the player is required to make a wager on the game. The player may make any wager that is permitted in terms of the rules of the particular game that is played. The player's wager is denominated as an integral number of units of credit. There must be sufficient credit in the player's credit account to cover any wager that is made.

The gaming and poker server (202) also includes a further software module (218), referred to as a credit administration facility that performs all functions relating to the player credit account, such as account management, banking, cash-out, and the like.

The balance of the player's credit account from time to time is a function of credit purchases made by the player from time to time, wagers made by the player on any game that the player plays, payouts arising from the wagers made by the player. The casino database (214) stores a current balance of the player's credit account from time to time and logs all wagers made by the player. The credit administration facility (218) updates the player's credit account balance in accordance with the ebb and flow of the player's game play.

A Priori Promotion Credit

In addition to credit purchased by the player as described above, promotion credit may accrue to the player from time to time, either at registration, termed a sign-on bonus, or as a result of a purchase of credit, termed a purchase bonus. Such sign-on or purchase bonuses are awarded by the entity that provides Internet casino games and Internet multiplayer poker, usually to attract new players to register for play, and to encourage registered players to play the games that are available for play. The a priori promotion credit that accrues to the player is subject to the following restrictions:

the a priori promotion credit may be used for game play only and may not be cashed in at any time;

winnings arising from wagers made with the a priori promotion credit may be cashed out subject to a 5× play through requirement;

wagers on all available casino games offered for play by the casino qualify towards meeting the play through requirements, that is, there are no excluded games; and the a priori promotion credit may not be used to play Internet multiplayer poker.

The casino database (214) also logs all wagers that the player makes using the a priori promotion credit and stores a balance of the non-cashable portion of the player's credit account, a balance of the player's play through requirement, and a balance of play through achieved by the player. The credit administration facility (218) updates the balance of the play through achieved in accordance with wagers made by the player during game play.

In order to better illustrate the principle of the invention, a hypothetical example of game play by the player at the online casino will now be discussed.

Example 1 the player purchases 100 units of credit and is awarded a purchase bonus of 50 units of a priori promotion credit, subject to a 5× play through requirement before he may cash in any winnings arising out of the 50 units of promotion credit.

the player's credit account balance, at this stage has a total balance of 150 units, comprising a cashable balance of 100 units and a non-cashable balance of 50 units, since the a priori promotion credit is inherently non-cashable.

the player then undertakes some game play on Internet casino games during which wagers totalling, say, 130 units are made and the player's credit account balance fluctuates, say, between 170 and 120 units.

the player credit account reflects a cashable balance of 100 units, a non-cashable balance ranging between 70 and 20 units in accordance with the ebb and flow of game play, a total of 130 units of wagers that have already contributed to the game play through requirement, and a total of 120 units of wagers still to be placed in order to meet the play through requirement.

the player undertakes further game play until a total of 300 units of credit has been wagered, and the player's credit account balance is, say, 170 units.

the player's credit account now reflects a cashable balance of 120 units comprised of 100 units from the original purchase made by the player and 20 units of winnings arising from the original a priori promotion credit, which are now cashable as the play through requirement has been met. The player also has a non-cashable balance of 50 units, which is the original a priori promotion credit and which may never be cashed in.

Figure 4:
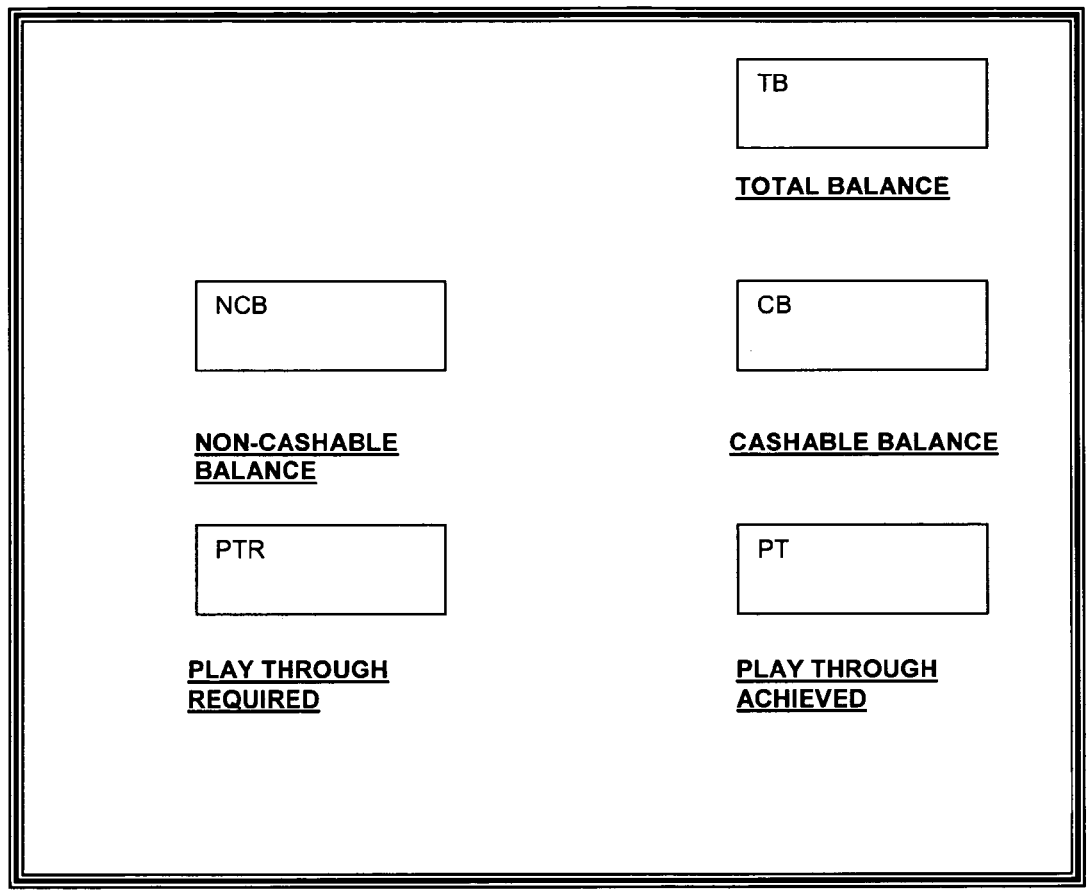
FIG. 4 is a display of a cash-out screen showing a composition of a player credit account where the player has been awarded a priori promotion credit.

During game play, the player may cash out at any stage by activating a cash-out icon (not shown) on the client computer (200), which causes a cash-out screen, as shown in FIG. 4 to be displayed on the client computer. The credit administration facility (218) flushes the non-cashable balance of the player's credit account in order to determine the cashable balance of the player's credit account that can be cashed out by the player. The credit administration facility (218) also computes a total of wagers still to be made by the player in order to meet the play through requirement and be able to cash out all or part of the player's winnings. The cash-out screen of FIG. 4 on the client computer (200) displays the following variables to the player:

a) total balance of the player's credit account;
b) balance of the player's credit account that is cashable;
c) balance of the player's credit account that is non-cashable;
d) play through achieved by the player; and
e) play through still required before the non-cashable credit balance may be cashed out by the player.

The credit administration facility (218) uses the following equations to compute the above variables:

1.1) Award of a Priori Promotion Credit $$TB = TB + Bonus \quad (1)$$

$$NCB = NCB + Bonus \quad (2)$$

$$PTR = PTR + Bonus * PTx \quad (3)$$

where:

TB=Total Balance, i.e. the total balance of the player credit account that is available for game play, namely the sum of the Cashable Balance and the Non-Cashable Balance;

Bonus=the quantum of the a priori promotion credit that is credited to the player's account; and NCB=Non Cashable Balance i.e. the portion of the players' balance that may not be cashed out, but is available for game play on house edge service games.

PTR=Play Through Required, i.e. the total amount that must be wagered for the play through requirement to be met; and PTx=Play Through Multiplier, i.e. the multiplier that is applied to the a priori promotion credit to determine the Play Through Required.

Equations (1) and (2) are recursive equations that, whenever a priori promotion credit is awarded to the player, increase the player's Total Balance and Non-Cashable Balance by the quantum of the a priori promotion credit (i.e. Bonus). Equation (3) is a further recursive equation that, whenever a priori promotion credit is awarded to the player, increases the Play Through Required by the quantum of the a priori promotion credit (i.e. Bonus) multiplied by the play-through requirement (i.e. Play Through Multiplier).

1.2) Placement of a Wager $$PT = PT + Wager$$

$$PT = \min(PT, PTR) \quad (4)$$

where:

Wager=an amount wagered in a house edge services game; and

PT=Play Through Achieved, i.e. the total of all wagers placed that qualify to be counted against the play through requirement.

Equation (4) is a further recursive equation that increases the Play Through Achieved by an amount of each wager made by the player on any house edge services game. The Play Through Achieved is subject to an upper limit equal to the Play Through Required.

1.3) Cash-Out Screen if $(PT<PTR)$ or $(NCB=0)$ then $CB=TB-NCB$ else if $(PT>=PTR)$ then $CB = TB - \min(NCB, [PTR/PTx]) \quad (5)$ where:

CB=Cashable Balance of the player credit account that is available to the player to cash out.

Equation (5) provides that the player may cash out the Total Balance less the Non Cashable Balance if the play through requirement is not fulfilled. If the Non Cashable Balance has reduced to zero, the player may cash out the Total Balance. Further, if the play through requirement is met, the amount that the player may cash out is the Total Balance less the cumulative a priori promotional credit awarded to the player or the Non Cashable Balance, whichever is the smaller. In other words, the maximum amount that the player is prevented from cashing out is the quantum of the awarded a priori promotion credit.

The application of equations (1) to (5) above will more clearly understood with reference to the following three illustrative scenarios which set out different players' game play activities at an online casino at which the following promotions are in force:

a bonus of 20 units of a priori promotion credit is awarded to each new player who registers an account; and a bonus of 100% of any purchase of credit made by a player.

Any credit purchased by a player is always cashable, while any a priori promotion credit is not cashable.

| Scenario 1: The Fortunate Player | | | | |
|---|---|---|---|---|
| Event | Total Balance | Non-Cashable Balance | Play Through Achieved | Play Through Required |
| New Account Registered | 0 | 0 | 0 | 0 |
| A priori Promotion Credit awarded (Sign-on Bonus) | 20 | 20 | 0 | 100 |
| Player wagers 5 units on Blackjack, wins 10 units | 25 | 25 | 5 | 100 |
| Player wagers 5 units on Blackjack, loses | 20 | 20 | 10 | 100 |
| Player wagers 20 units on Blackjack, wins 40 units | 40 | 40 | 30 | 100 |
| Player wagers 40 units on Blackjack, wins 80 units | 80 | 80 | 70 | 100 |
| Player wagers 40 units on Blackjack, loses | 40 | 40 | 110 | 100 |
| Player goes to Cash-Out Screen | 40 | 40 | 110 | 100 |
| Non-cashable balance is flushed. | 40 | 20 | 100 | 100 |

At this point, the player has been fortunate, and has had a 118% return (a total of 110 units have been wagered, and received a total payout of 130 units). The player may now cash out his winnings (20 units over and above the original a priori Promotion Credit), but NOT the original a priori Promotion Credit amount of 20 units.

| | | | | |
|---|---|---|---|---|
| Player cashes out 20 units | 20 | 20 | 100 | 100 |
| Player wagers 10 units on Blackjack, wins 20 units | 30 | 30 | 110 | 100 |
| Player goes to Cash-out screen. Non-cashable balance is flushed.. | 30 | 20 | 110 | 100 |

The player is still on a fortunate streak, and has had a 125% return (a total of 120 units has been wagered, resulting in a total payout of 150 units). The player may now cash out his additional winnings (10 units over and above the original Promotion Credit), but NOT the original a priori Promotion Credit amount of 20 units.

| Scenario 2: The Typical Player | | | | |
|---|---|---|---|---|
| Event | Total Balance | Non-Cashable Balance | Play Through Achieved | Play Through Required |
| New Account Registered | 0 | 0 | 0 | 0 |
| A priori Promotion Credit awarded (Sign-on Bonus) | 20 | 20 | 0 | 100 |
| Player wagers 5 units on Blackjack, wins 10 units | 25 | 25 | 5 | 100 |
| Player wagers 5 units on Blackjack, loses | 20 | 20 | 10 | 100 |
| Player wagers 10 units on Blackjack, wins 20 units | 30 | 30 | 20 | 100 |
| Player wagers 10 units on Blackjack, and loses | 20 | 20 | 30 | 100 |
| Player wagers 10 units on Blackjack, loses | 10 | 10 | 40 | 100 |
| Player wagers 10 units on Blackjack, wins 20 units | 20 | 20 | 50 | 100 |
| Player wagers 10 units on Blackjack, loses | 10 | 10 | 60 | 100 |
| Player goes to Cash-Out Screen | 10 | 10 | 60 | 100 |
| Non-cashable balance is flushed. | 10 | 10 | 60 | 100 |

At this point, the player has had a fairy typical run of fortune, winning 3 wagers and losing 4. The player has 10 units left of his original a priori Promotion Credit of 20 units, which may not be cashed in.

| | | | | |
|---|---|---|---|---|
| Player purchases 100 units | 110 | 10 | 60 | 100 |
| 100% a priori Promotion Credit awarded (Purchase Bonus) | 210 | 110 | 60 | 600 |
| Player goes to Cash-Out screen. Non-cashable balance is flushed | 210 | 110 | 60 | 600 |

Only the 100 unit purchase is cashable. The 10 units remaining from the original Promotion Credit (i.e. the 20 unit Sign-on Bonus) and the subsequent Promotion Credit (i.e. the 100 unit Purchase Bonus) may not be cashed in, since the play through requirements have not been met.

| | | | | |
|---|---|---|---|---|
| Player wagers 60 units on Blackjack, loses | 150 | 50 | 120 | 600 |
| Player wagers 60 units on Blackjack, loses | 90 | 0 | 0 | 0 |

As soon as the player exhausts all Promotion Credit, and dips into his own private credit, he is absolved of all play through requirements.

| Scenario 3: The Statistically Accurate Player | | | | |
|---|---|---|---|---|
| This scenario is based on a game of chance in which an average of 97% of each wager is returned to the player, that is, the game has a house edge of 3% | | | | |
| Event | Total Balance | Non-Cashable Balance | Play Through Achieved | Play Through Required |
| New Account Registered | 0 | 0 | 0 | 0 |
| A priori Promotion Credit awarded (Sign-on Bonus) | 20 | 20 | 0 | 100 |
| Player wagers one cycle of entire balance of 20 units on the 97% game | 19.40 | 19.40 | 20 | 100 |
| Player wagers one cycle of entire balance of 19.40 units on the 97% game | 18.82 | 18.82 | 39.40 | 100 |
| Player wagers one cycle of entire balance of 18.82 units on the 97% game | 18.25 | 18.25 | 58.22 | 100 |
| Player wagers one cycle of entire balance of 18.25 units on the 97% game | 17.71 | 17.71 | 76.47 | 100 |
| Player wagers one cycle of entire balance of 17.71 units on the 97% game | 17.17 | 17.17 | 94.18 | 100 |
| Player wagers one cycle of entire balance of 17.17 units on the 97% game | 16.65 | 16.65 | 110.83 | 100 |
| Player goes to Cash-Out Screen | 16.65 | 16.65 | 110.83 | 100 |
| Non-cashable balance is flushed. | 16.65 | 16.65 | 110.83 | 100 |

The statistically accurate player will have 83.25% of his original Promotion Credit left after meeting the requirements of a 5x play through. As this is LESS than the original amount of the a priori Promotion Credit, the player is not eligible to cash out any amount. If the player continues to wager the remaining a priori Promotion Credit through the same game according to the statistical average of 97% per cycle, he will slowly deplete his balance.

The credit administration (218) maintains two credit account balances in the casino database (214) for each player, namely the player's total credit balance and the player's non-cashable balance, the difference of the two balances being the player's cashable balance, which is subject to a minimum of zero. The non-cashable balance is incremented when new a priori promotion credit is awarded, and decremented at cash-out when play through requirements that have been met, are flushed.

It will be appreciated by those skilled in the art that this method for administering promotions is transparent as the player is able, at any time, to obtain a detailed analysis of the player's credit account balance, namely the total balance of the player credit account, a subtotal of the credit account balance that is available for cash-out, a sub-total of the total account balance that is not available for cash-out, a required play through total, and a play through total already achieved. This transparency removes the frustration currently experienced by players who have initiated a cash-out of their credit account balances, only to have their cash-out transactions cancelled and their player credit accounts re-credited at a later stage.

The method is also advantageous for online casino management as cash-outs can be performed automatically without manual intervention, thereby eliminating the need to review the cash-out transactions against player game play records.

The method eliminates bonus abuse by the simple expedient of not allowing a priori promotion credit to be cashed out at any stage. As illustrated in Scenario 3 above, a player using only a priori promotion credit to play a narrow profit margin casino game until fairly modest play through requirements have been met will, on average, not be able to achieve a cash-out. At the same time, the method is fair to skilled players who are able to cash out any winnings derived from the a priori promotion credit after the play through requirements have been met. This means that the online casino management will be able to set low play through requirements for any particular a priori promotion bonus awarded to a player, thus increasing the attractiveness of the casino promotion to would-be players. Further, even with modest play through requirements, the casino operator need not exclude wagers on narrow profit margin games from contributing to the play through requirements.

In order to further increase the attractiveness of a casino promotion to would-be players, online casino management may place an alternative set of restrictions on the a priori promotion credit that accrues to the player, as outlined in a variation of this embodiment, as outlined below:
 the a priori promotion credit may be used for game play and is initially non-cashable;
 the a priori promotion credit may be cashed in subject to a 5× play through requirement;
 the a priori promotion credit becomes cashable progressively in increments of 10 units subject to the 5× play through requirement;
 any winnings arising from wagers made with the a priori promotion credit are cashable;
 wagers on all available casino games offered for play by the casino qualify towards meeting the play through requirements, that is, there are no excluded games;
 any cash-out by the player causes any remaining non-cashable a priori promotion credit to be forfeited;
 the a priori promotion credit may not be used to play Internet multiplayer poker; and
 different games of chance contribute different percentages of a wager amount towards the play through requirement, as follows:

| | |
|---|---|
| Slots: | 100% |
| Blackjack: | 50% |
| Video Poker: | 25% |
| Craps: | 25% |
| Roulette: | 10% |
| All other games: | 100% |

As in the previous example, The casino database (214) also logs all wagers that the player makes using the a priori promotion credit and stores a balance of the non-cashable portion of the player's credit account, a balance of the player's play through requirement, and a balance of play through achieved by the player. The credit administration facility (218) updates the balance of the play through achieved in accordance with wagers made by the player during game play that contribute towards fulfillment of the play through requirement associated with the a priori promotion credit that has accrued to the player.

In order to better illustrate the principle of this variation of the embodiment of the invention, a further hypothetical example of game play by the player at the online casino will now be discussed.

Example 2 the player purchases 100 units of credit and is awarded a purchase bonus of 50 units of a priori credit, subject to a 5× play through requirement before he may cash out the a priori promotion credit of 50 units.
the player's credit account balance, at this stage, has a total balance of 150 units, comprising a cashable balance of 100 units and a non-cashable balance of 50 units, since the a-priori promotion credit is non-cashable at this stage.
the player then undertakes some game play on Internet casino games, wagering a total of 100 units on slot games (where 100% of each player wager contributes to the play through requirement) and ends up with a total credit balance of 170 units of credit.
the player's credit account is composed as follows:
a) a total credit balance of 170 units;
b) a cashable balance 140 units, consisting of the player's original purchase amount of 100 units, 20 units of a priori promotion credit that have become cashable by meeting play through requirements progressively (namely 10 units of a priori promotion credit for every 50 units of play through achieved by the player), and winnings of 20 units over and above the original 100 unit purchase;
c) 30 units of a priori promotion credit that may not be cashed in as the player has not met the play through requirement; and
d) a total of 100 units of play through achieved of a total of 250 units of play through required in order to cash out the entire 50 units of a priori promotion credit.

During game play, the player may cash out at any stage by activating a cash-out icon (not shown) on the client computer (200), which causes the cash-out screen as shown in FIG. 4 to be displayed on the client computer. The credit administration facility (218) flushes the non-cashable balance of the player's credit account in order to determine the cashable balance of the player's credit account that can be cashed out by the player. The credit administration facility (218) also computes a total of wagers still to be made by the player in order to meet the play through requirement and be able to cash out all or part of the player's winnings. The cash-out screen of FIG. 4 on the client computer (200) displays the following variables to the player:

a) total balance of the player's credit account;
b) balance of the player's credit account that is cashable;
c) balance of the player's credit account that is non-cashable;
d) play through achieved by the player; and
e) play through still required before the non-cashable credit balance may be cashed out by the player.

The credit administration facility (218) uses the following equations to compute the above variables:

2.1) Award of a Priori Promotion Credit $$TB = TB + Bonus \quad (6)$$

$$NCB = NCB + Bonus \quad (7)$$

$$PTR = PTR + (Bonus * PTx) \quad (8)$$

where:
TB=Total Balance, i.e. the total balance of the player credit account that is available for game play, namely the sum of the Cashable Balance and the Non-Cashable Balance;
Bonus=the quantum of the a priori promotion credit that is credited to the player's account; and
NCB=Non Cashable Balance i.e. the portion of the players' balance that may not be cashed out, but is available for game play on house edge service games.
PTR=Play Through Required, i.e. the total amount that must be wagered for the play through requirement to be met; and
PTx=Play Through Multiplier, i.e. the multiplier that is applied to the a priori promotion credit to determine the Play Through Required.

Equations (6) and (7) are recursive equations that, whenever a priori promotion credit is awarded to the player, increase the player's Total Balance and Non-Cashable Balance by the quantum of the a priori promotion credit (i.e. Bonus). Equation (8) is a further recursive equation that, whenever a priori promotion credit is awarded to the player, increases the Play Through Required by the quantum of the a priori promotion credit (i.e. Bonus) multiplied by the play-through requirement (i.e. Play Through Multiplier).

2.2) Placement of a Wager $$PT = PT + Wager$$

$$PT = \min(PT, PTR) \quad (9)$$

where:
Wager=an amount wagered in a house edge services game.
PT=Play Through Achieved, i.e. the total of all wagers placed that qualify to be counted against the play-through requirement; and Equation (9) is a further recursive equation that increases the Play Through Achieved by an amount of each wager made by the player on any house edge services game. The Play Through Achieved is subject to an upper limit equal to the Play Through Required.

2.3) Cash-Out Screen $$BC = \text{round}(PT/PTx, CI) \quad (10)$$

$$NCB = NCB - BC \quad (11)$$

$$PT = PT - (BC * PTx) \quad (12)$$

$$PTR = PTR - (BC * PTx) \quad (13)$$

$$CB = \min[(TB - NCB), 0] \quad (14)$$

where:
BC=Bonus Amount Cashable, i.e. a portion of the player's a priori promotion credit that is eligible for cash-out due to play-through requirements being met;
CI=Cashable Increment, i.e. a minimum increment from the non-cashable balance that becomes cashable at a time; and
CB=Cashable Balance of the player credit account that is available to the player to cash out.

Equation (10) converts the Play Through Achieved to a Bonus Amount Cashable, which is calculated as an integral number of Cashable Increments that may be cashed out as a function of the Play Through Achieved. Equation (11) decrements the player's Non Cashable Balance by the Bonus Amount Cashable determined in (10). Equations (12) and (13) decrement each of the Play Through Achieved and the Play Through Required by Bonus Amount Cashable multiplied by the Play Through Multiplier. Equation (14) provides that the player may only cash out the difference between the Total Balance and the Non Cashable Balance, which has already been decremented by the Bonus Amount Cashable. The Cashable Balance is subject to a minimum of zero.

2.4) Cash-Out

If the player elects to cash-out all of his Cashable Balance, the following operations occur before the cash-out request is processed:

$$TB = TB - CB \quad (15)$$

$$NCB = 0 \quad (16)$$

$$PT = 0 \quad (17)$$

In equations (15) to (17), the player's Total Balance is reduced by the Cashable Balance, and the player's Non Cashable Balance and Play Through Achieved are reset to zero, respectively, reflecting the fact that any a priori promotion credit remaining in the player's account is forfeited at cash-out. If the player elects, instead, to cash out only a part of his Amount Available for Cash-out, equation (15) only reduces the player's Total Balance by the relevant portion of the Cashable Amount that the player wishes to redeem, while equations (16) and (17) remain unchanged.

The application of equations (6) to (17) above will be more clearly understood with reference to the following three illustrative scenarios which set out different players' game play activities at an online casino at which the following promotions are in force:

a bonus of 20 units of credit is awarded is awarded to each new player who registers an account; and
a bonus of 100% of any purchase of credit made by a player, up to a maximum of 500 units of credit.

Any credit purchased by a player is always cashable, while any promotion credit awarded is cashable only after play-through requirements of 5× have been met. Promotion credit is converted from non-cashable to cashable in increments of 10 units.

All games contribute to play-through requirements, as follows:

| | |
|---|---|
| Slots: | 100% |
| Blackjack: | 50% |

-continued

| | | |
|---|---|---|
| Video Poker: | 25% | |
| Craps: | 25% | |
| Roulette: | 10% | |
| All other games: | 100% | |

Scenario 4: The Lucky Player

| Event | Total Balance | Non-Cashable Balance | Play Through Achieved | Play Through Required |
|---|---|---|---|---|
| New Account Registered | 0 | 0 | 0 | 0 |
| A priori Promotion Credit Awarded (Sign-on Bonus) | 20 | 20 | 0 | 100 |
| Player wagers 10 units on Blackjack, wins 20 units | 30 | 20 | 5 | 100 |
| Player wagers 10 units on Blackjack, loses | 20 | 20 | 10 | 100 |
| Player wagers 20 units on Blackjack, wins 40 units | 40 | 20 | 20 | 100 |
| Player wagers 40 units on Blackjack, wins 80 units | 80 | 20 | 40 | 100 |
| Player wagers 40 units on Blackjack, loses | 40 | 20 | 60 | 100 |
| Player goes to Cash-Out Screen | 40 | 20 | 60 | 100 |
| Non-cashable balance is flushed | 40 | 10 | 10 | 50 |

At this point, the player has been fortunate, and has had a 117% return (a total of 120 units have been wagered, and received a total payout of 140 units). The player has also earned 10 units of the non-cashable a priori promotion credit by his play-through, and these 10 units are now cashable. The player therefore has 30 units available to cash out.

| | | | | |
|---|---|---|---|---|
| Player cashes out 30 units | 0 | 0 | 0 | 0 |

The player has cashed out his full cashable balance of 30 units, and the remaining a priori promotion credit of 10 units has been forfeited. The player is never prevented from cashing out, but there is a disincentive to do so as any remaining a priori promotion credit is forfeited.

Scenario 5: The Typical Player

| Event | Total Balance | Non-Cashable Balance | Play Through Achieved | Play Through Required |
|---|---|---|---|---|
| New Account Registered | 0 | 0 | 0 | 0 |
| A priori Promotion Credit Awarded (Sign-on Bonus) | 20 | 20 | 0 | 100 |
| Player wagers 10 units on Blackjack, wins 20 units | 30 | 20 | 5 | 100 |
| Player wagers 10 units on Blackjack, loses | 20 | 20 | 10 | 100 |
| Player wagers 10 units on Blackjack, wins 20 units | 30 | 20 | 15 | 100 |
| Player wagers 10 units on Blackjack, loses | 20 | 20 | 20 | 100 |
| Player wagers 10 units on Blackjack, loses | 10 | 20 | 25 | 100 |
| Player wagers 10 units on Blackjack, wins 20 units | 20 | 20 | 30 | 100 |
| Player wagers 10 units on Blackjack, loses | 10 | 20 | 35 | 100 |
| Player goes to Cash-Out Screen | 10 | 20 | 35 | 100 |
| Non-cashable balance is flushed | 10 | 20 | 35 | 100 |

At this point, the player has had a fairy typical run of luck, winning 3 wagers and losing 4. The player has 10 units left of his original 20 units of a priori promotion credit, but may not cash this out as insufficient play-through has been achieved to make any of the a priori promotion credit cashable.

| | | | | |
|---|---|---|---|---|
| Player purchases 100 units | 110 | 20 | 35 | 100 |
| 100% a priori Promotion Credit awarded (Purchase Bonus) | 210 | 120 | 35 | 600 |
| Player goes to Cash-Out screen. Non-cashable balance is flushed | 210 | 110 | 35 | 600 |

Only the 100 unit purchase is cashable. Neither the 10 units remaining from the original a priori Promotion Credit (i.e. the original 20 unit Sign-on Bonus) nor the subsequent a priori Promotion Credit (i.e. the 100 unit Purchase Bonus) may be cashed out, since the play-through achieved is insufficient to make any of these amount cashable.

| | | | | |
|---|---|---|---|---|
| Player wagers 60 units on Blackjack, loses | 150 | 110 | 65 | 600 |
| Player goes to Cash-Out screen. Non-cashable balance is flushed | 150 | 100 | 15 | 550 |

The player now has 50 units available to cash out. He has lost 60 units of his own money, but has earned the right to cash out 10 units of his a priori promotion credit by achieving the required play-through.

Scenario 6: The Statistically Accurate Player
This example is based on a game of chance in which an average of 97% of each wager is returned to the player, and which contributes 100% of each wager amount to the play-through requirements.

| Event | Total Balance | Non-Cashable Balance | Play Through Achieved | Play Through Required |
|---|---|---|---|---|
| New Account Registered | 0 | 0 | 0 | 0 |
| A priori Promotion Credit Awarded (Sign-on Bonus) | 20 | 20 | 0 | 100 |
| Player wagers one cycle of entire balance of 20 units on the 97% game | 19.40 | 20 | 20 | 100 |
| Player wagers one cycle of entire balance of 19.40 units on the 97% game | 18.82 | 20 | 39.40 | 100 |
| Player wagers one cycle of entire balance of 18.82 units on the 97% game | 18.25 | 20 | 58.22 | 100 |
| Player wagers one cycle of entire balance of 18.25 units on the 97% game | 17.71 | 20 | 76.47 | 100 |
| Player wagers one cycle of entire balance of 17.71 units on the 97% game | 17.17 | 20 | 94.18 | 100 |
| Player wagers exactly 5.82 units on the 97% game | 16.99 | 20 | 100 | 100 |

-continued

Scenario 6: The Statistically Accurate Player
This example is based on a game of chance in which an average of 97% of each wager is returned to the player, and which contributes 100% of each wager amount to the play-through requirements.

| Event | Total Balance | Non-Cashable Balance | Play Through Achieved | Play Through Required |
|---|---|---|---|---|
| Player goes to Cash-Out Screen | 16.99 | 20 | 100 | 100 |
| Non-cashable balance is flushed | 16.99 | 0 | 0 | 0 |

The statistically accurate player will have 84.95% of his original a priori Promotion Credit left after meeting a 5x play-through requirement. The player's entire credit balance is now available for cash-out.

While this scenario may, at first, appear favourable to a bonus abuser, it will be appreciated that it is based on very favourable conditions for the player, namely a 5× play-through requirement and a game that contributes 100% of each wager amount to the play-through requirement.

The above example is very sensitive to changes in either of these parameters, as indicated below:

1. a 10× play-through requirement and a game such as Blackjack that contributes 50% of each wager amount to the play-through requirements means that the statistically accurate player will end up with 38.9% of his promotion credit after meeting the play-through requirements;
2. a 5× play-through requirement and a game such as Video Poker that contributes 25% of each wager amount to the play-through requirements means that the statistically accurate player will end up with 24.6% of his promotion credit after meeting the play-through requirements
3. a 5× play-through requirement and a game such as Roulette that contributes 10% of each wager amount to the play-through requirements means that the statistically accurate player will end up with less than 1% of his promotion credit after meeting the play-through requirements The credit administration facility (218) maintains two credit account balances in the casino database (214) for each player, namely the player's total credit balance and the player's non-cashable balance, the difference of the two balances being the player's cashable balance, which is subject to a minimum of zero. The non-cashable balance is incremented when new promotion credit is awarded, and decremented at cash-out when play through requirements that have been met, are flushed.

It will be further appreciated that the subsystem (1) for administering promotions is transparent as the player is able, at any time, to obtain a detailed analysis of his player credit account balance, namely the total credit balance of the player account, a sub-total of the credit account balance that is available for cash-out, a sub-total of the account balance that is not available for cash-out, a required play through total, and a play through total already achieved. This transparency removes the frustration currently experienced by players who have cashed out their account balances, only to have the cash-out requests denied and their credit accounts re-credited at a later stage.

The system (1) is also advantageous for online casino managements as cash-outs can be performed automatically without manual intervention, thereby eliminating the need to review the cash-outs against player game play reports.

The system (1) eliminates bonus abuse by the simple expedient of allowing promotion credit to be cashed out in discrete increments as a play through requirements is progressively met. As illustrated in Scenario 6 above, a player using only promotion credit to play a narrow profit margin game until a fairly modest play through requirement has been met will, on average, only be able to achieve a modest cash-out. At the same time, the system is fair to skilled players who are able to cash out any winnings derived from the promotion credit. This means that the casino management will be able to set low play through requirements for any particular bonus awarded to a player, thus increasing the attractiveness of the casino promotion to would-be players. Further, even with modest play-through requirements, the casino operator need not exclude play of narrow profit margin games from contributing to meeting play through requirements. The casino management is, however, able to weight the contribution of any particular casino game to the play through requirements in order to reduce the chances of a player successfully abusing the promotion credit by playing purely narrow profit margin games.

A Posteriori Promotion Credit

As previously described, a posteriori promotion credit is not made available to the player for immediate use, but only becomes available for use by the player once certain conditions associated with the promotion credit have been met. The a posteriori promotion credit that accrues to the player is subject to the following restrictions:

the a posteriori promotion credit will only be credited to the player's credit account once a play through requirement has been met by playing Internet multiplayer poker.

once the play through requirement has been met, the a posteriori promotion credit is immediately cashable and may also be used to play Internet casino games.

play of any Internet casino games is excluded from meeting the play through requirements associated with the a posteriori promotion credit.

The casino database (214) logs all wagers that the player makes while playing a game of Internet multiplayer poker and stores a balance of the player's required play through, and a balance of play through achieved by the player to date. The credit administration facility (218) updates the balance of the play through achieved in accordance with wagers made by the player during the course of the Internet multiplayer poker game.

In order to better illustrate the principle of the invention, a hypothetical example of play of Internet multiplayer poker by the player will now be discussed.

Example 3 the player purchases 50 units of credit and is awarded a purchase bonus of 10 units of a posteriori promotion credit that remains pending, subject to a 25× play through requirement whereupon the a posteriori promotion credit will be credited to the player's credit account.

the player's credit account balance, at this stage, has a total balance of 50 units, all of which is cashable.

the player then undertakes some play of Internet multiplayer poker during which wagers totalling, say, 170 units are made and the player's credit account balance fluctuates, say, between 20 and 110 units.

during this time, the player credit account reflects a cashable balance ranging between 20 and 110 units, a total of 170 units of wagers that have already contributed to the play through requirement, and 80 units of wagers still to be made in order to meet the play through requirement.

the player undertakes further play of Internet multiplayer poker until a total of 250 units of credit has been wagered, and the player's credit account balance is, say, 70 units.

The player's credit account will now reflect a cashable balance of 80 units comprised of the 70 units arising out of regular game play and 10 units of a posteriori promotion credit, which have now been awarded as the play through requirement has been met.

Figure 5:
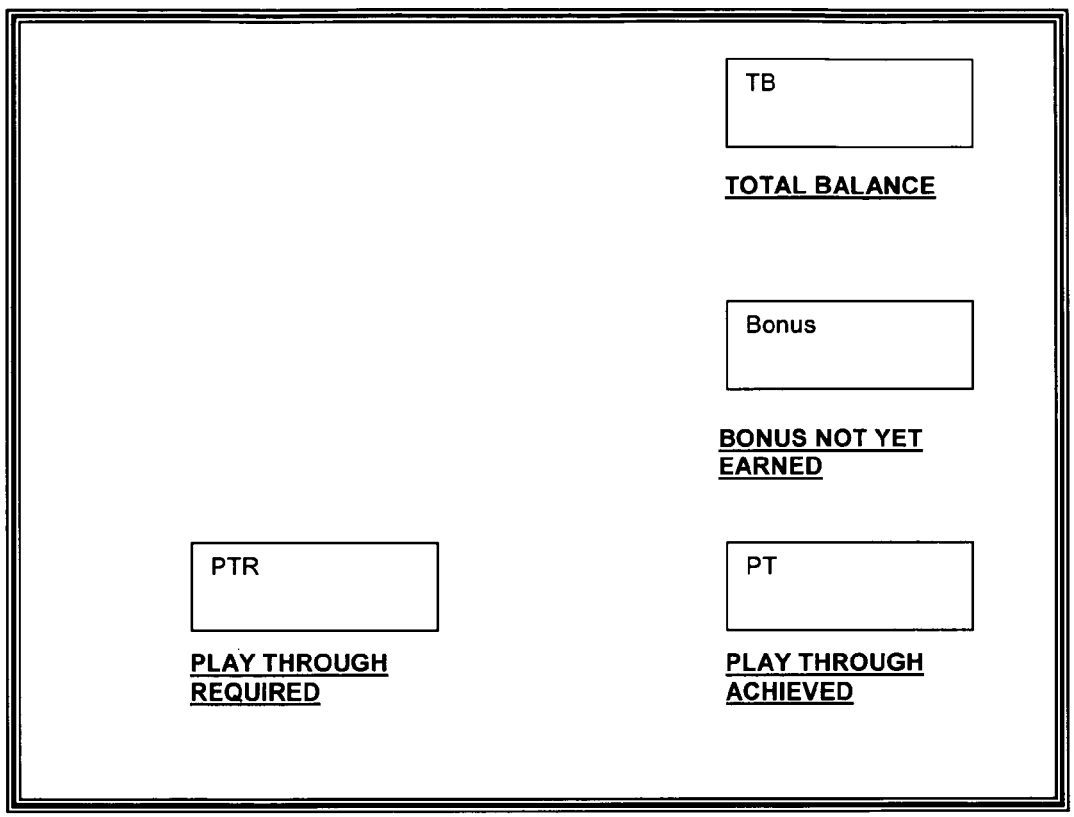
FIG. 5 is a display of a cash-out screen showing the composition of a player credit account where the player has been awarded a posteriori promotion credit.

During game play, the player may cash out at any stage by activating a cash-out icon (not shown) on the client computer (200), which causes a cash-out screen as shown in FIG. 5 to be displayed on the client computer. The credit administration facility (218) computes a total of wagers still to be made by the player in order to meet the play through requirement and cause the a posteriori promotion credit to become eligible for cash-out. The cash-out screen of FIG. 5 on the client computer (200) displays the following variables to the player:

a) total balance of the player's credit account;
b) total of the a posteriori promotion credit awarded but still pending subject to play through requirements;
c) play through achieved by the player; and
d) play through still required before the a posteriori promotion credit becomes eligible for cash-out.

The gaming and poker server (202) uses the following equations to compute the above variables:

3.1) Award of a Posteriori Promotion Credit $$PTR=PTR+(Bonus*PTx) \quad (18)$$

where:
Bonus=the quantum of the a posteriori promotion credit that is provisionally awarded to the player;
PTR=Play Through Required, i.e. the total amount that must be wagered on peer-to-peer services for the play through requirement to be met; and
PTx=Play Through Multiplier, i.e. the multiplier that is applied to the a posteriori promotion credit to determine the Play Through Required.

Equation (18) is a recursive equation that, whenever a priori promotion credit is awarded to the player, increases the Play Through Required by the quantum of the a posteriori promotion credit (i.e. Bonus) multiplied by the play-through requirement (i.e. Play Through Multiplier).

3.2) Placement of a Wager $$PT=PT+Wager \quad (19)$$

if (PT>PTR)

$$then\ PT=PTR \quad (20)$$

if (PT>=PTR)

$$then\ TB=TB+Bonus \quad (21)$$

where:
Wager=an amount wagered in a peer-to-peer services game.
PT=Play Through Achieved, i.e. the total of all wagers placed that qualify to be counted against the play through requirement; and Equation (19) is a further recursive equation that increases the Play Through Achieved by an amount of each wager made by the player on any peer-to-peer services game. The Play Through Achieved is subject to an upper limit equal to the Play Through Required, as indicated by equation (20). Equation (20) reflects that the total balance of the player credit account is increased by the amount of the a posteriori promotion credit once the play through requirement has been met.

3.3) Cash-Out Screen $$CB=TB \quad (22)$$

where:
CB=Amount Available for Cash-out by the player.

At cash-out, the total balance of the player's credit account is cashable, which includes a posteriori promotion credit for which the play through requirement has been achieved, as reflected in equation (22).

The application of equations (19) to (22) above will be more clearly understood in the following illustrative scenarion that sets out a player's game play activities at an online poker room at which the following promotion is in force:

a bonus of 10 units of a posteriori promotion credit is awarded to each new player who registers an account.

| Scenario 7: The Typical Player | | | | |
|---|---|---|---|---|
| Event | Total Balance | Non-Cashable Balance | Play Through Achieved | Play Through Required |
| New Account Registered | 0 | 0 | 0 | 0 |
| A posteriori Promotion Credit Awarded (Sign-on Bonus) | 0 | 0 | 0 | 250 |
| At this point, the player has not purchased any credit and the 10 units of a posteriori promotion credit that have been awarded to the player are contingent upon meeting a 25x play through requirement. | | | | |
| Player purchases 50 units | 50 | 0 | 0 | 250 |
| Player wagers 10 units on multiplayer poker, loses | 40 | 0 | 10 | 240 |
| Player wagers 20 units on multiplayer poker, wins 50 units | 70 | 0 | 30 | 220 |
| Player wagers 40 units on multiplayer poker, loses | 30 | 0 | 70 | 180 |
| Player wagers 30 units on multiplayer poker, wins 100 units | 100 | 0 | 100 | 150 |
| Player wagers 100 units on multiplayer poker, wins 110 units | 110 | 0 | 200 | 50 |
| Player wagers 50 units on multiplayer poker, loses | 70 | 0 | 250 | 0 |
| At this point, the player has met the 25x play through requirement by having made cumulative wagers of 250 units. The 10 units of a posteriori promotion credit conditionally awarded to the player has been credited to the player's credit account and is immediately cashable. The player therefore has 70 units to cash out. | | | | |
| Player goes to Cash-Out Screen | 70 | 0 | 250 | 0 |
| Non-cashable balance is flushed | 70 | 0 | 250 | 0 |
| Player cashes out 70 units | 0 | 0 | 0 | 0 |

The player has cashed out his full cashable balance of 70 units, including the 10 units of a posteriori promotion credit that have been earned by meeting the play through requirement.

This method of administering a posteriori promotion credit is transparent as the player is able, at any time, to obtain a detailed analysis of his or her player credit account balance, namely a total balance of the player credit account, a quantum of a posteriori promotion credit awarded but still subject to play through requirements, a required play through total, and a play through total already achieved. This transparency helps to build player trust in an entity operating the Internet multiplayer poker room.

Mixed a Priori/a Posteriori Promotion Credit

In cases where an operating entity enables a player to have a single credit account and play both house edge services, such as Internet casino games, and peer-to-peer services, such as Internet multiplayer poker, it will be appreciated that promotions conducted by such an entity may result in a player being awarded both a priori and a posteriori promotion credit in accordance with the entity's business objectives. For example, the entity may entice prospective players with a sign-on bonus consisting of a priori promotion credit, whereas if the entity wishes to promote a particular peer-to-peer service to its existing players, such as multiplayer poker, it may do so by means of a purchase bonus consisting of a posteriori promotion credit that is associated with the poker game.

The principles outlined above in respect of a priori and a posteriori promotion credit, taken alone, are directly applicable to a situation where a player can have a mix of both a priori and a posteriori promotion credit. The only additional restrictions to be employed are:

- the a priori promotion credit and a posteriori promotion credit each have separate play through requirements;
- play through achieved for a priori and a posteriori promotion is recorded separately;
- a priori promotion credit which has not become cashable may not be used to wager on peer-to-peer services; and
- a posteriori promotion credit, once required play through requirements have been met, can be used for wagers on house edge services.

Figure 6:
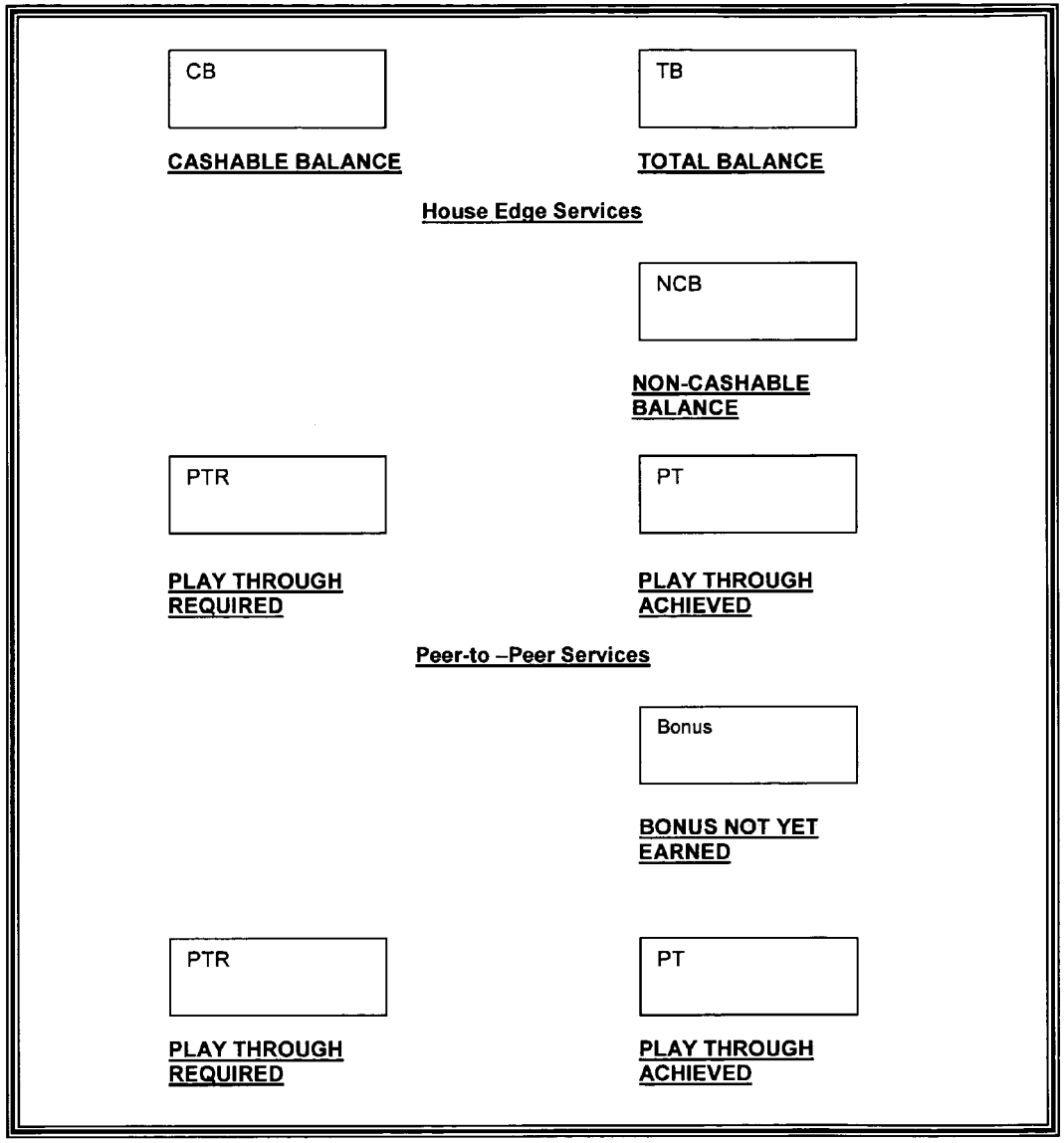
FIG. 6 is a display of a cash-out screen showing the composition of a player credit account where the player has been awarded a priori and a posteriori promotion credit.

Irrespective of whether a player is playing a house edge service or a peer-to-peer service game, the player may cash out at any stage by activating a cash-out icon (not shown) on the client computer (200), which causes a cash-out screen of FIG. 6 to be displayed on the client computer. The credit administration facility (218) computes the following variables as described above:

a) total balance of the player's credit account;
b) balance of the player's credit account that is cashable;
c) balance of the player's credit account that is non-cashable;
d) play through achieved for a priori promotion credit;
e) play through still required for the a priori promotion credit to become cashable;
f) a posteriori promotion credit awarded but still subject to play through requirement;
g) play through achieved for a posteriori promotion credit; and
h) play through still required before the a posteriori promotion credit becomes cashable.

FIGS. 7-13 are flow charts showing the flow of messages (300) between the gaming and poker server (202) and the client computer (200), and processing steps performed at both the gaming and poker server (202) and client computer (200), to administer a priori and a posteriori promotion credit while a player is participating in house edge services and peer-to-peer services. The message flow (300) assumes that the client computer (200) has initially accessed the web site hosted by the gaming and poker server (202), downloaded the necessary software modules of FIG. 2 and installed them on the client computer, and registered to play games at the online casino and poker room on the client computer (200). Reference should be made to FIGS. 1-6 in the following discussion, in which the notation used in equations (1) to (22) will be used.

Figure 7:
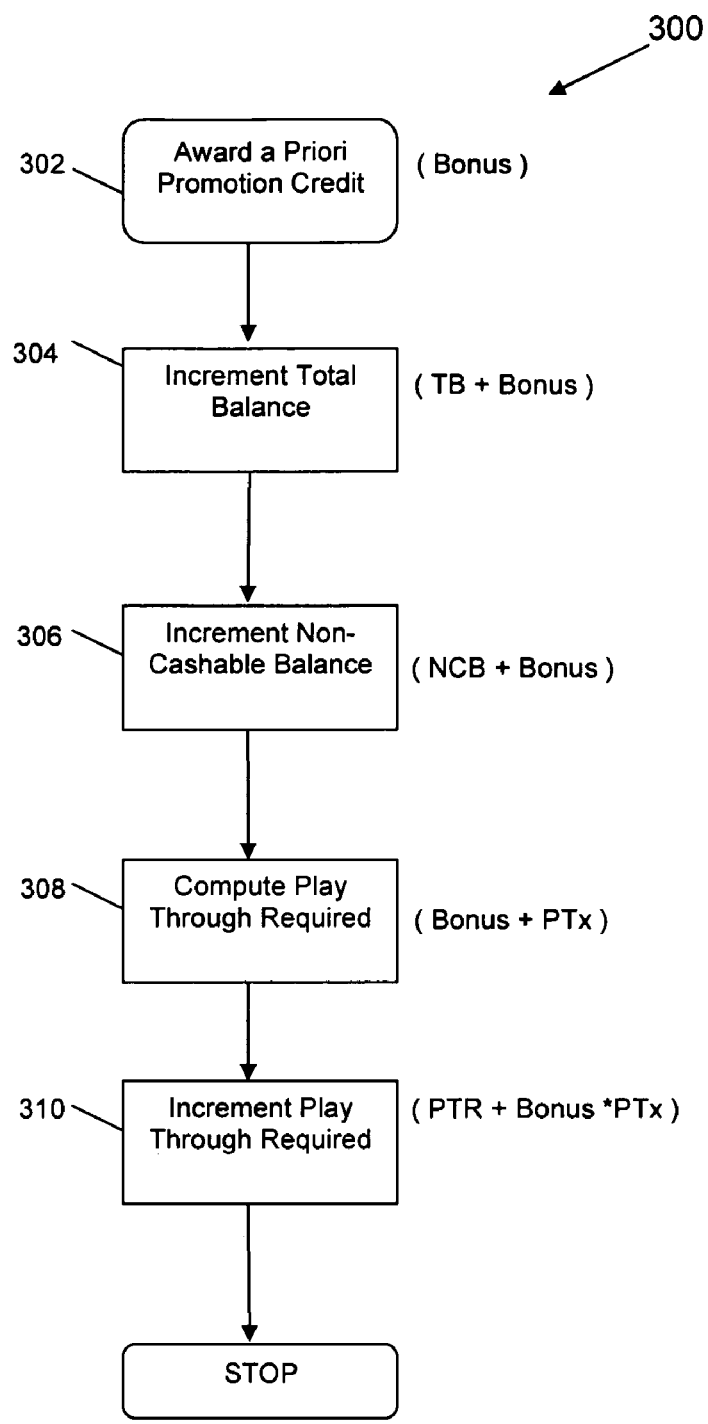
FIGS. 7-13 are flow charts showing the flow of messages between the gaming and poker server and the client computer, and processing steps performed at both the gaming and poker server and the client computer, to administer the a priori and a posteriori promotion credit awarded to the player as illustrated in FIGS. 1 to 6.

Starting with FIG. 7, the process starts at step (302) with a priori promotion credit being awarded to a player.

At step (304), the credit administration facility (218) increases the Total Balance of the player's credit account by the amount of the a priori promotion credit.

At step (306), the credit administration facility (218) increases the Non-Cashable Balance of the player's credit account by the amount of the a priori promotion credit.

At step (308), the credit administration facility (218) computes a play through requirement as a function of the amount of a priori promotion credit and the Play Through Multiplier.

At step (310), the credit administration facility (218) increments the Play Through Required by the play through requirement computed in step (308). Steps (302) to (310) are for one award of a priori promotion credit to the player and the flow may repeat any number of times as the player is awarded a priori promotion credit repeatedly.

Figure 8:
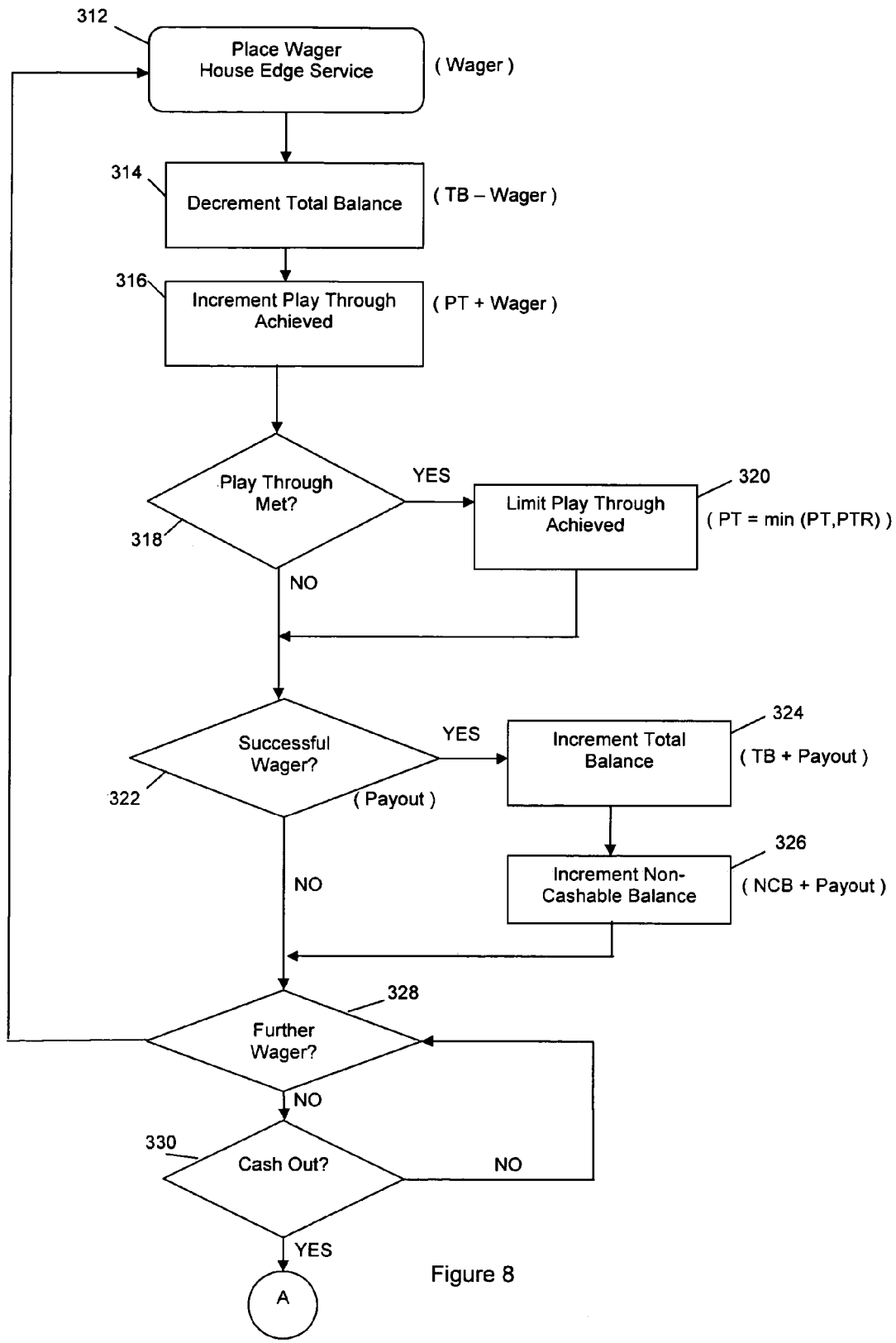

Referring to FIG. 8, the player makes a wager at step (312) on a house edge service game that is available for play.

At step (314), the credit administration facility (218) decrements the Total Balance of the player credit account by the size of the wager.

At step (316), the credit administration facility (218) increments the Play Through Achieved balance by the size of the wager.

At steps (318) and (320), the credit administration facility (218) ensures that the Play Through Achieved never exceeds the Play Through Required that arises from the awarded a priori promotion credit.

At step (322), the credit administration facility (218) determines whether the player's wager has been successful, resulting in a payout to the player. If the answer is no, the gaming and poker server (202) waits for the player to select a further action, as will be described below.

If the answer is yes, the credit administration facility (218), at step (324), increments the Total Balance of the player credit account with the payout and, at step (326), increments the Non-Cashable Balance of the player credit account with the payout. The gaming and poker server (202) then waits for the player to select a further action.

The player may decide, at step (328), to make a further wager, whereupon the process returns to step (312).

Figure 9:
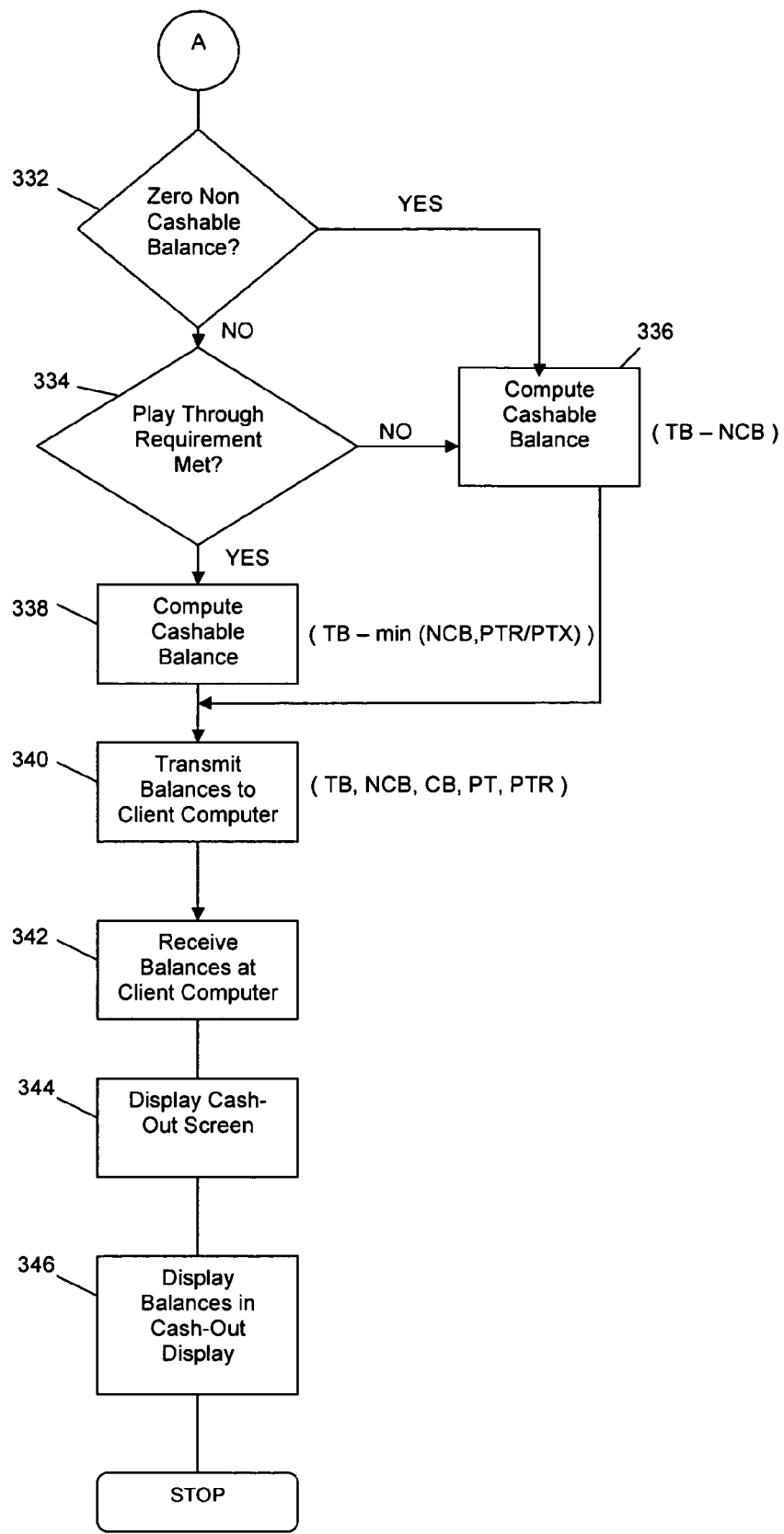
Figure 10:
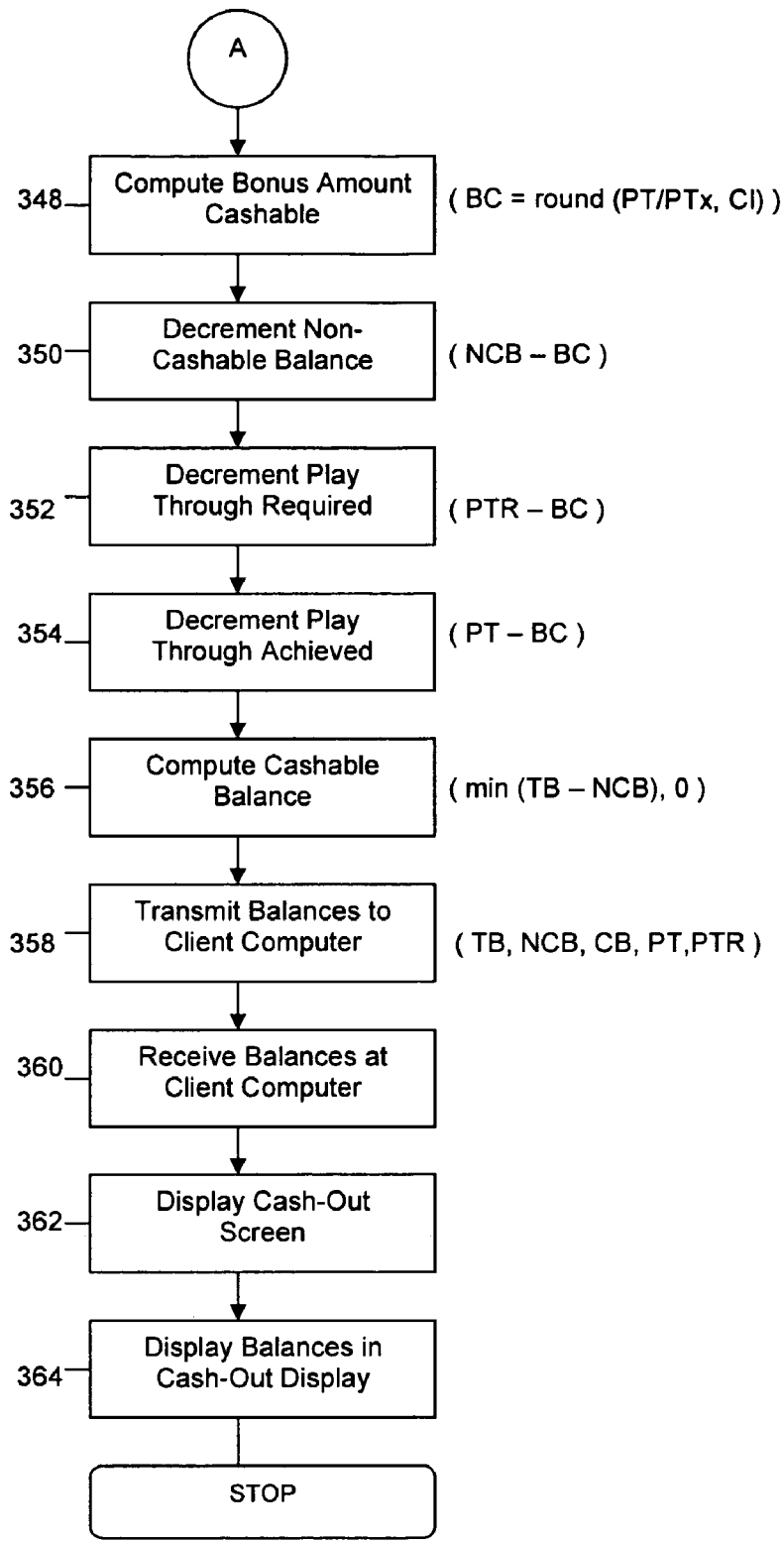

The player may decide, at step (330), to cash out, in which case the processing flow continues with FIG. 9 or FIG. 10, which correspond to the alternative embodiments of Examples 1 and 2, respectively.

In FIG. 9, at step (332), the credit administration facility (218) determines whether the Non-Cashable balance of the player credit account is zero. If the answer is yes, the credit administration facility (218), at step (336), sets the Cashable Balance of the player credit account to be equal to the Total Balance.

If the answer is no, at step (334), the credit administration facility (218) determines whether the play through requirement associated with the a priori promotion credit has been met. If the answer is no, the credit administration facility (218) computes, at step (336), the Cashable Balance to be the difference between the Total Balance and the Non-Cashable Balance.

If the answer is yes, the credit administration facility (218) computes, at step (338), the Cashable Balance of the player credit account as the difference between the Total Balance and the lesser of the Non-Cashable Balance and the a priori promotion credit awarded to the player.

At step (340), the gaming and poker server (202) transmits the following credit account balances to the client computer (200): the Total Balance, the Non-Cashable Balance, the Cashable Balance, the Play Through Achieved and the Play Through Required.

The client computer (200) receives the transmitted balances at step (342), displays the cash-out screen at step (344) and inserts the various received balances in the cash-out display at step (346).

In FIG. 10, at step (348), the credit administration facility (218) computes a quantity of the a priori promotion credit, in multiples of the Cashable Increment, awarded to the player that is eligible for cash-out due to play through requirements being met.

At step (350), the credit administration facility (218) decrements the Non-Cashable Balance by the quantity computed in step (348).

At steps (352) and (354), the credit administration facility (218) decrements the Play Through Required and Play Through Achieved balances, respectively, by the quantity computed in step (348).

At step (356), the credit administration facility (218) computes the Cashable Balance as the difference between the Total Balance of the player credit account and the Non-Cashable Balance, subject to a minimum of zero. The Non-Cashable Balance has previously been decremented, in step (350), by the quantity of a priori promotion credit that has become eligible for cash-out as computed in step (348).

At step (358), the gaming and poker server (202) transmits the following credit account balances to the client computer (200): the Total Balance, the Non-Cashable Balance, the Cashable Balance, the Play Through Achieved and the Play Through Required.

The client computer (200) receives the transmitted balances at step (360), displays the cash-out screen at step (362) and inserts the various received balances in the cash-out display at step (364).

Figure 11:
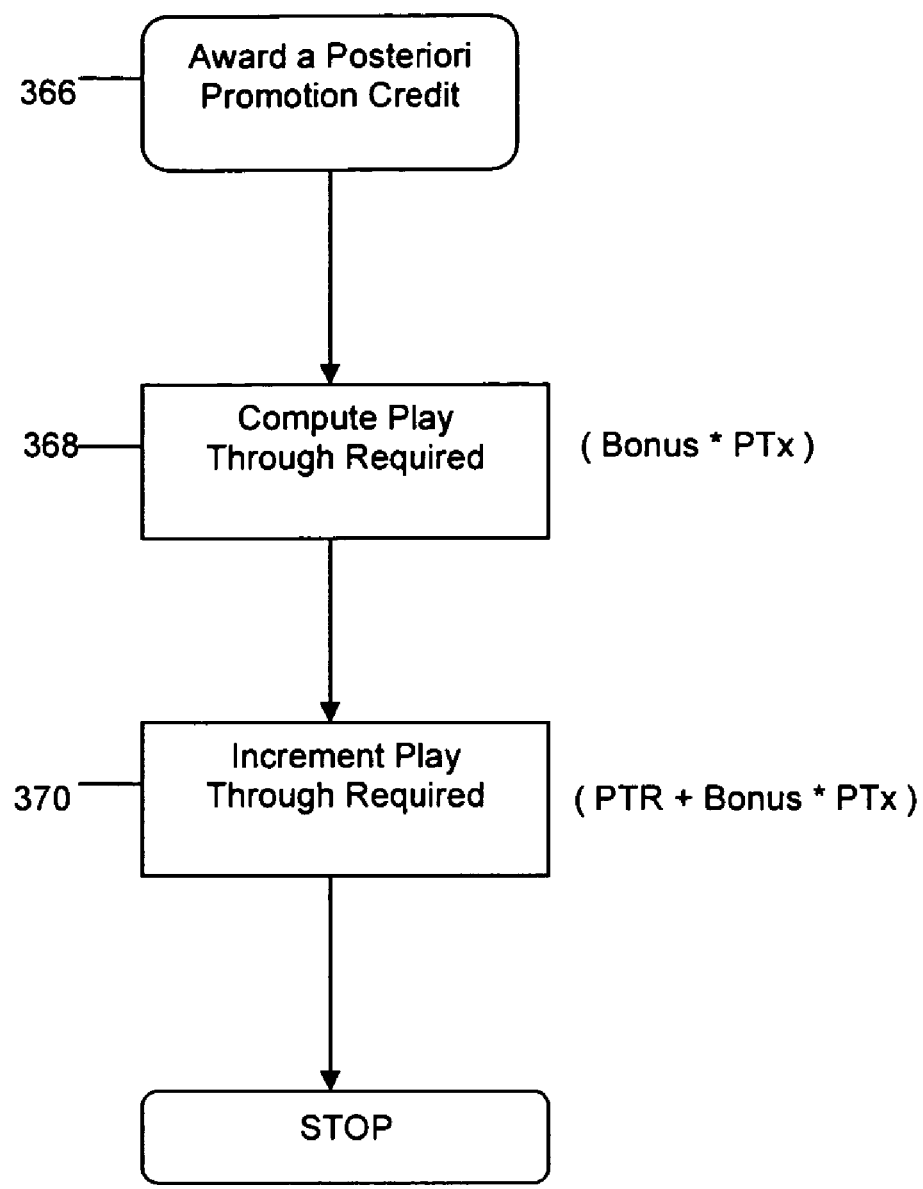

In FIG. 11, the process commences at step (366) with an award of a posteriori promotion credit to a player.

At step (368), the credit administration facility (218) computes an incremental play through required before the a posteriori promotion credit awarded to the player becomes eligible for cash-out.

At step (370), the credit administration facility (218) increases the Play Through Required balance by the incremental play through computed in step (368)

Steps (366) to (370) are for one award of a posteriori promotion credit to the player and the flow may repeat any number of times as the player is awarded a posteriori promotion credit repeatedly.

Figure 12:
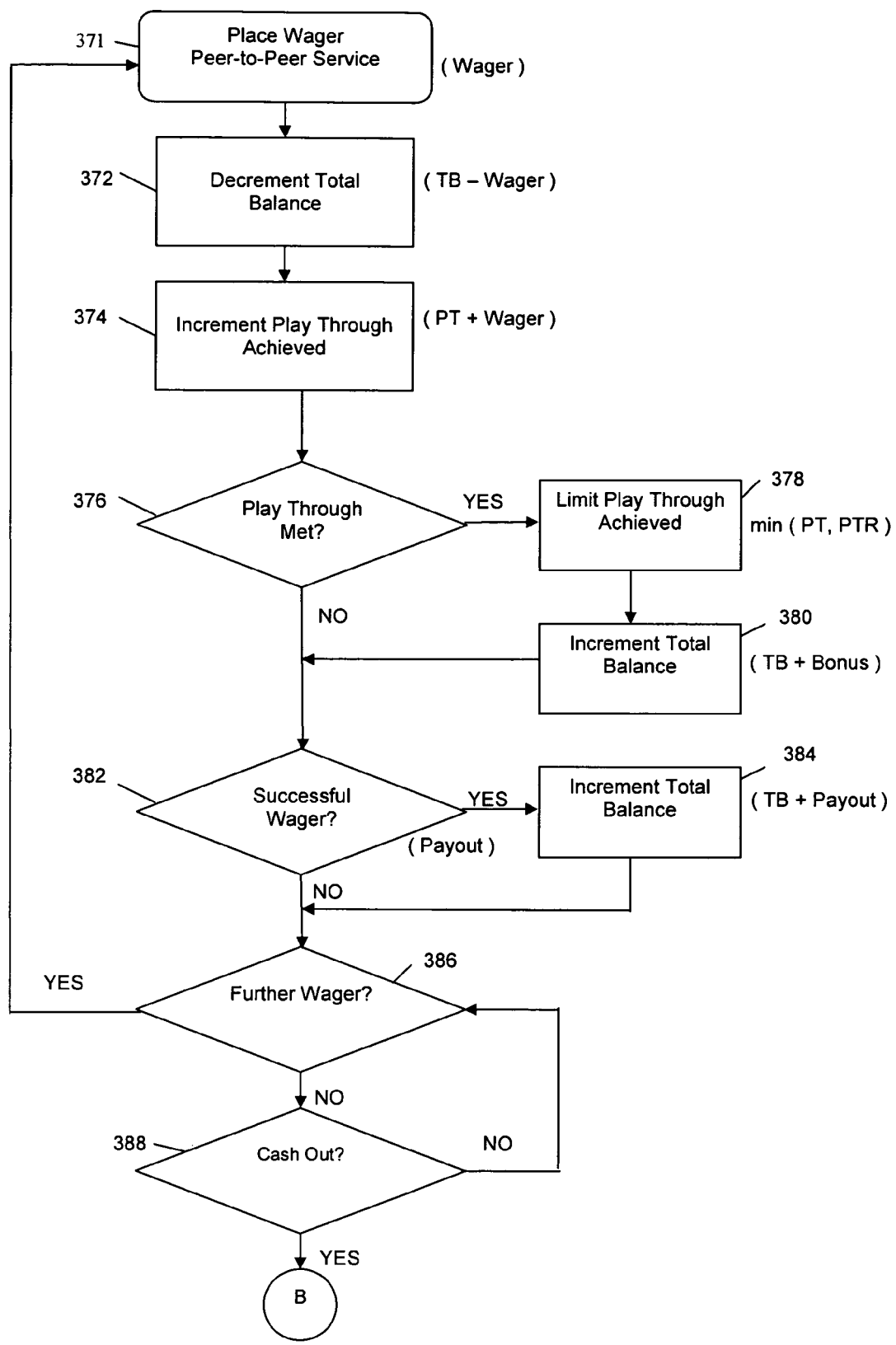

Referring to FIG. 12, the player makes a wager at step (371) on a peer-to-peer service game that is available for play.

At step (372), the credit administration facility (218) decrements the Total Balance of the player credit account by the size of the wager.

At step (374), the credit administration facility (218) increments the Play Through Achieved balance by the size of the wager.

At step (376), the credit administration facility (218) determines whether the play through requirement has been satisfied. If the answer is yes, the credit administration facility (218) ensures, at step (378), that the Play Through Achieved balance never exceeds the Play Through Required balance that arises from awarded a posteriori promotion credit and, at step (380), increments the Total Balance of the player credit account by the amount of the a posteriori promotion credit, which has now become eligible for cash-out. If the answer is no, the credit administration facility (218), at step (382), determines whether the player's wager has been successful, resulting in a payout to the player. If the answer is no, the gaming and poker server (202) waits for the player to select a further action, as will be described below.

If the answer is yes, the credit administration facility (218), at step (384), increments the Total Balance of the player credit account with the payout. The gaming and poker server (202) then waits for the player to select a further action.

The player may decide, at step (386), to make a further wager, whereupon the process returns to step (370).

Figure 13:
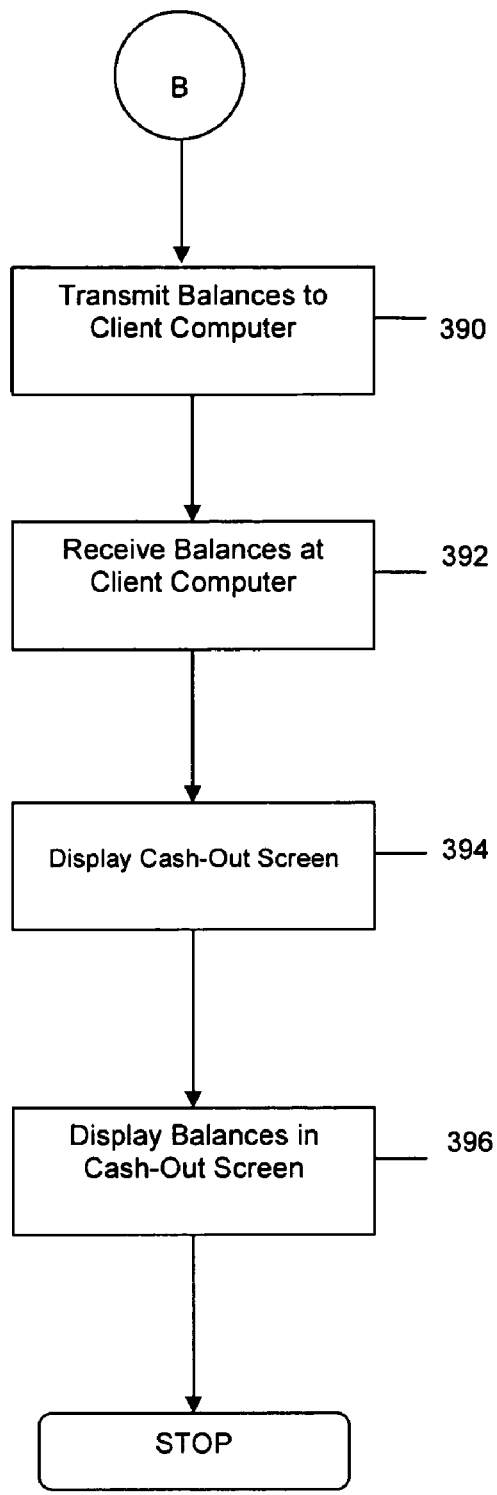

The player may decide, at step (388), to cash out, in which case the processing flow continues with FIG. 13.

In FIG. 13, at step (390), the gaming and poker server (202) transmits the following credit account balances to the client computer (200): the Total Balance, the balance of a priori promotion credit awarded to the player that has not yet become eligible for cash-out, the Play Through Achieved and the Play Through Required.

The client computer (200) receives the transmitted balances at step (392), displays the cash-out screen at step (394) and inserts the various received balances in the cash-out display at step (396).

Numerous modifications are possible to the preferred embodiments outlined above without departing from the scope of the invention. In particular, where an entity offers only house edge services to players, the credit administration facility need only implement those elements of the invention that are relevant to administration of a priori promotion credit. Analogously, where an entity offers only peer-to-peer services to its players, the credit administration facility need only implement those elements of the invention that are relevant to the administration of a posteriori promotion credit.

Further, the a priori and a posteriori promotion credit may be subject to different rules to those outlined in the above discussion. For example, where a priori promotion credit is awarded to a player as a result of a purchase bonus, both the credit purchased by the player and the resulting a priori promotion credit may be barred from cash-out until play through requirements have been met, whereafter both the credit purchased by the player, as well as winnings arising from wagers made with the a priori promotion credit itself become eligible, incrementally, to be cashed out by the player. Alternatively, cash-out of any winnings arising out of wagers made with the a priori promotion credit may be subject to meeting the play through requirements. Further alternatively, a player awarded any a priori promotion credit may be subject to a restriction that limits any cash-out made by the player to an amount equal to the amount of credit initially purchased by the player, until the play through requirement in respect of the a priori promotion credit has been completely satisfied. This restriction allows the player to always have an option of leaving a house-edge service game with his own money, while simultaneously still providing a reasonable margin of safety against the bonus abuser.

Still further, the play through requirement in respect of a posteriori promotion credit may not be a predetermined multiple of the a posteriori promotion credit, as described above. For example, the play through requirement in respect of a posteriori promotion credit can be participation in a predetermined number of "raked hands" in an online poker room, or play of a predetermined number of "qualifying games" in another peer-to-peer service.

Yet further, the credit administration facility may be executed in a separate application server (not shown) instead of on the gaming and poker server (202), the application server being communicable with the gaming and poker server (202) by means of the Internet Protocol Network (206). The system may be configured to operate with a play through requirement grater than or lesser that 5× in respect of a priori promotion credit and 25× in respect of a posteriori promotion credit The elements of the system (1) relating to a priori promotion credit may also be applied in conjunction with any electronic gaming device on which credit is used to make wagers on games. Such electronic gaming devices are commonly found in land-based casino establishments where players are required to pre-purchase credit, which is then loaded onto magnetic cards or smart cards for use on any of the electronic gaming devices.

The invention therefore provides a system for administering promotions, which is transparent to players, minimises any potential abuse of promotion credit, is fair to skilled players and is simple to administer.

The invention claimed is:

1. A system comprising:
   a credit administration facility for administering any a priori promotion credit and any a posteriori credit associated with a player account, the credit administration facility being operable to compute:
   (i) a total balance of the player account as a function of wagers made by the player on house edge services, in which a house acts as a banker, and wagers made by the player on peer-to-peer services, in which the house does not act as a banker but levies a transaction charge;
   (ii) play through achieved for the any a priori promotion credit;
   (iii) play through achieved for the any a posteriori promotion credit; and
   (iv) a cashable portion of the total balance, wherein the cashable portion is affected by play through achieved for the any a priori promotion credit in accordance with a first play through requirement and by play through achieved for the any a posteriori promotion credit in accordance with a second play through requirement.

2. The system of claim 1, wherein winnings arising from wagers made with the any a priori promotion credit contribute to the cashable portion when the first play through requirement is met.

3. The system of claim 2, wherein the any a priori promotion credit does not contribute to the cashable portion at any time.

4. The system of claim 1, wherein the any a priori promotion credit progressively contributes to the cashable portion as a function of wagers made by the player on house edge services.

5. The system of claim 1, wherein the any a posteriori promotion credit contributes to the cashable portion when the second play through requirement is met.

6. A method comprising:
   a server computer computing a total balance of a player account as a function of wagers made by the player on house edge services, in which a house acts as banker, and wagers made by the player on peer-to-peer services, in which the house does not act as banker but levies a transaction charge;
   the server computer computing play through achieved for any a priori promotion credit associated with the player account;
   the server computer computing play through achieved for any a posteriori promotion credit associated with the player account; and
   the server computer computing a cashable portion of the total balance, wherein the cashable portion is affected by play through achieved for the any a priori promotion credit in accordance with a first play through requirement and by play through achieved for the any a posteriori promotion credit in accordance with a second play through requirement.

7. The method of claim 6, wherein winnings arising from wagers made with the any a priori promotion credit contribute to the cashable portion when the first play through requirement is met.

8. The method of claim 7, wherein the any a priori promotion credit does not contribute to the cashable portion at any time.

9. The method of claim 6, wherein the any a priori promotion credit progressively contributes to the cashable portion as a function of wagers made by the player on house edge services.

10. The method of claim 6, wherein the any a posteriori promotion credit contributes to the cashable portion when the second play through requirement is met.

* * * * *